(12) United States Patent
Carpenter

(10) Patent No.: US 10,448,735 B2
(45) Date of Patent: Oct. 22, 2019

(54) METHODS OF MOUNTING CONTAINER SUPPORT BODIES, SYSTEMS, KITS, ASSEMBLIES, AND APPARATUSES INCLUDING SAME, AND USES OF SAME

(71) Applicant: William B. Carpenter, Squamish (CA)

(72) Inventor: William B. Carpenter, Squamish (CA)

( * ) Notice: Subject to any disclaimer, the term of this patent is extended or adjusted under 35 U.S.C. 154(b) by 46 days.

(21) Appl. No.: 14/775,372

(22) PCT Filed: Mar. 15, 2013

(86) PCT No.: PCT/CA2013/000259
§ 371 (c)(1),
(2) Date: Sep. 11, 2015

(87) PCT Pub. No.: WO2014/032158
PCT Pub. Date: Mar. 6, 2014

(65) Prior Publication Data
US 2016/0029790 A1 Feb. 4, 2016

(51) Int. Cl.
*A47B 73/00* (2006.01)
*A47F 5/08* (2006.01)
(Continued)

(52) U.S. Cl.
CPC .............. *A47B 73/00* (2013.01); *A47B 47/00* (2013.01); *A47B 95/008* (2013.01);
(Continued)

(58) Field of Classification Search
CPC ...... A47F 5/0823; A47F 5/0815; A47B 73/00; A47B 73/006; F16B 5/0216; F16B 5/0233
See application file for complete search history.

(56) References Cited

U.S. PATENT DOCUMENTS 583,727 A * 6/1897 Braun .................... A47B 73/00
211/74
632,321 A 9/1899 Olney
(Continued)

FOREIGN PATENT DOCUMENTS

AU 31578/97 A 2/1999
CA 2677021 A1 2/2010
(Continued)

OTHER PUBLICATIONS

Norskor Olsen APS web page http://noerskovolsen.dk/billeder.htm, accessed on May 14, 2015, wine rack design published in 2004, 2 pages.
(Continued)

*Primary Examiner* — Kimberley S Wright
(74) *Attorney, Agent, or Firm* — Kolisch Hartwell, P.C.

(57) ABSTRACT

There is disclosed a method of mounting a container support body to a mounting body, the method comprising: threadedly coupling a first threaded portion of a fastener to the mounting body; and coupling an end portion of the fastener to the container support body in an opening defined by the container support body. There is also disclosed a container support apparatus comprising a container support body comprising: a structural body comprising a structural material; and a frictional body on the structural body and comprising a frictional material different from the structural material; wherein the frictional material defines a frictional support surface extending substantially along an entire length of the container support body. Other methods, other apparatuses, and systems, kits, assemblies, and uses are also disclosed.

48 Claims, 26 Drawing Sheets

(51) Int. Cl.
*A47F 7/28* (2006.01)
*A47B 47/00* (2006.01)
*A47B 95/00* (2006.01)
*F16B 9/02* (2006.01)

(52) U.S. Cl.
CPC .............. *A47F 5/0815* (2013.01); *A47F 7/28* (2013.01); *F16B 9/026* (2013.01)

(56) References Cited

U.S. PATENT DOCUMENTS

| | | | |
|---|---|---|---|
| 1,084,243 A | | 1/1914 | Young |
| 1,891,099 A | | 12/1932 | Land |
| 1,937,295 A | | 11/1933 | Rettenmeyer |
| 2,051,408 A | | 8/1936 | Karst |
| 2,327,379 A | | 8/1943 | Thomas |
| 2,527,796 A | | 10/1950 | Clute |
| 3,339,814 A | | 9/1967 | Carbine |
| 3,461,769 A | * | 8/1969 | Brosseit ................ F16B 5/0233 403/408.1 |
| 3,478,457 A | | 11/1969 | Watkins |
| D232,284 S | | 8/1974 | Shuck |
| 3,901,389 A | | 8/1975 | Belokin, Jr. |
| D236,565 S | * | 9/1975 | Fuller ......................... D6/682.6 |
| D260,463 S | | 9/1981 | Imus |
| 4,310,273 A | * | 1/1982 | Kirrish .................. F16B 5/0233 411/338 |
| 4,482,065 A | * | 11/1984 | Altemose ............... A47B 73/00 211/74 |
| 4,494,788 A | | 1/1985 | Altemose |
| 4,496,124 A | | 1/1985 | Cole |
| D284,720 S | | 7/1986 | Watson |
| D295,128 S | | 4/1988 | Gentile |
| 4,787,591 A | | 11/1988 | Villacorta |
| 4,819,815 A | | 4/1989 | Tarlow et al. |
| 4,887,726 A | | 12/1989 | Cizaire |
| 4,944,415 A | | 7/1990 | Orbach |
| 5,025,936 A | | 6/1991 | Lamoureaux |
| 5,098,241 A | * | 3/1992 | Aldridge ................ A62C 37/09 285/321 |
| 5,499,724 A | | 3/1996 | Hickman |
| 5,503,276 A | | 4/1996 | Pierce |
| 5,785,187 A | * | 7/1998 | Lipman .................. A47F 5/0815 211/54.1 |
| 5,813,550 A | | 9/1998 | Sheehan et al. |
| 5,865,326 A | | 2/1999 | Spamer et al. |
| 6,119,875 A | * | 9/2000 | Smith .................... A47F 5/0815 211/195 |
| 6,230,905 B1 | | 5/2001 | Camblor |
| 6,244,554 B1 | | 6/2001 | Baker |
| D460,295 S | | 7/2002 | Fissell et al. |
| D460,902 S | * | 7/2002 | Battle ........................... D7/708 |
| 6,442,906 B1 | * | 9/2002 | Hwang ............... E04F 15/0247 248/188.4 |
| 6,631,813 B1 | | 10/2003 | Walter et al. |
| 6,729,481 B1 | * | 5/2004 | O'Brien ................ A47B 73/00 211/74 |
| 6,763,956 B2 | * | 7/2004 | Woods ................... A47B 73/00 211/74 |
| D497,526 S | | 10/2004 | Sanders et al. |
| 6,991,117 B2 | * | 1/2006 | McCain ............... A47B 73/002 211/75 |
| 7,284,734 B2 | * | 10/2007 | Hamerski ............... A47G 1/20 248/205.3 |
| 7,322,482 B2 | | 1/2008 | Caradonna |
| 7,377,397 B2 | | 5/2008 | Lee et al. |
| 7,673,761 B2 | | 3/2010 | Lee et al. |
| 7,850,017 B2 | * | 12/2010 | McCain ............... A47B 73/002 211/74 |
| 7,882,967 B2 | | 2/2011 | Hynes |
| D634,992 S | | 5/2011 | McNamee |
| D655,986 S | | 3/2012 | Schneider |
| 8,231,015 B2 | | 7/2012 | McCain |
| 8,267,259 B2 | | 9/2012 | Fisher et al. |
| 8,573,548 B2 | | 11/2013 | Kuhn et al. |
| D708,494 S | * | 7/2014 | Carpenter ....................... D7/701 |
| 8,869,997 B2 | | 10/2014 | Collini |
| D731,866 S | | 6/2015 | Paulick |
| D735,540 S | * | 8/2015 | Carpenter ....................... D7/704 |
| D739,189 S | * | 9/2015 | Carpenter ....................... D7/701 |
| D739,190 S | * | 9/2015 | Kasza ............................. D7/701 |
| 9,149,115 B2 | * | 10/2015 | Kasza ..................... A47B 73/00 |
| 9,565,933 B2 | * | 2/2017 | Kasza ..................... A47B 73/00 |
| D785,418 S | * | 5/2017 | Carpenter ....................... D7/701 |
| 2001/0013567 A1 | | 8/2001 | Valiulis |
| 2004/0069730 A1 | * | 4/2004 | Woods ................... A47B 73/00 211/74 |
| 2006/0065612 A1 | | 3/2006 | Gonneville |
| 2007/0158284 A1 | | 7/2007 | Felder |
| 2010/0051769 A1 | * | 3/2010 | Tyson ................... A47F 5/0807 248/220.31 |
| 2011/0132853 A1 | | 6/2011 | Drobot et al. |
| 2011/0309220 A1 | | 12/2011 | Collini |
| 2012/0085721 A1 | | 4/2012 | Michael J. et al. |
| 2013/0200014 A1 | | 8/2013 | Schlatter |
| 2013/0334155 A1 | * | 12/2013 | Kasza ..................... A47B 73/00 211/75 |
| 2016/0331131 A1 | * | 11/2016 | Ghaeni .................. A47B 73/006 |
| 2017/0105522 A1 | * | 4/2017 | Kasza .................... A47B 73/006 |

FOREIGN PATENT DOCUMENTS

| | | |
|---|---|---|
| CA | 2743948 A1 | 5/2010 |
| DE | 202004018406 U1 | 1/2005 |
| DE | 102015101787 A1 | 8/2016 |
| FR | 2327743 A1 | 5/1977 |
| FR | 2456673 A1 | 12/1980 |
| GB | 1202519 A | 8/1970 |
| GB | 2122876 A | 1/1984 |
| GB | 2189387 A | 10/1987 |
| GB | 2242352 A | 2/1991 |
| JP | 2013542769 A | 11/2013 |
| KR | 101466012 B1 | 11/2014 |
| WO | 2014032158 A1 | 3/2014 |
| WO | 2017059543 A1 | 4/2017 |

OTHER PUBLICATIONS

Genuwine Cellars, proprietary material dated 2009, 2010 and 2012, 7 pages.
ESIGO catalog, http://pdf.archiexpo.com/pdf/esigo-srl/esigo-collection-2011/63264-66039-_6.html, 2011, 10 pages.
Vin De Garde Cellar Systems, Modern Wine Cellars Catalog 2011, 2011, 12 pages.
Photo of a wine cellar which appeared at web page http://www.houzz.com/photos/36895/Modern-Wine-Cellar-contemporary-wine-cellar-other-metro at least as early as Mar. 2011.
Email from Mr. Carpenter to Mr. Kasza dated May 26, 2011 discussing ESIGO 4 wine rack design, 1 page.
Photo of a wine cellar which appeared at web page http://www.houzz.com/photos/502220/Modern-Wine-Cellar-modern-wine-cellartoronto at least as early as Jan. 2012.
William B. Carpenter, photo of wine cellar dated Jan. 28, 2012.
Genuwine Cellars, Label Link (retrieved from http://www.genuwinecellars.com/metal-series/label-link/ on Jan. 25, 2013), 6 pages.
Genuwine Cellars, PEG System (retrieved from http://www.genuwinecellars.com/metal-series/peg-system/ on Jan. 25, 2013), 6 pages.
Genuwine Cellars, Metal Series (retrieved from http://www.genuwinecellars.com/metal-series/ on Feb. 21, 2013), 6 pages.
Houzz Inc., Bachus Bottle Rack—modern—wine racks—by Made in Design, 2013 (retrieved from http://www.houzz.com/photos/151858/Bachus-Bottle-Rack-modern-wine-racks- on Jul. 18, 2013), 2 pages.
Houzz Inc., Live-Edge Solid Walnut 6-Bottle Wine Rack—eclectic—wine racks—by Etsy, 2013 (retrieved from http://www.houzz.com/photos/2739502/Live-Edge-Solid-Walnut-6-Bottle-Wine-Rack-eclectic-wine-racks- on Jul. 18, 2013), 11 pages.

(56) References Cited

OTHER PUBLICATIONS

Houzz Inc., Wood & Metal Industrial Wine Rack—contemporary—wine racks—by World Market, 2013 (retrieved from http://www.houzz.com/photos/1548374/Wood---Metal-Industrial-Wine-Rack-contemporary-wine-racks- on Jul. 18, 2013), 2 pages.

Stact Wine Displays Inc., Stact revolutionary wine rack, 2013 (retrieved from http://www.getstact.com/collections/wine-rack-revolutionized on Jul. 18, 2013) 3 pages.

Heather Cardamore, Authorized Office, Canadian Intellectual Property Office, "International Search Report" in connection with related PCT Patent App. No. PCT/CA2013/000259, dated Dec. 23, 2013, 2 pages.

Federal Court of Canada, "Statement of Claim" in connection with *Stact Wine Displays Inc.* v. *William B. Carpenter*, May 14, 2015, 11 pages.

Australian Intellectual Property Office, "Examination report No. 1 for standard patent application" in connection with Australian Patent Application No. 2013308027, dated Nov. 28, 2017, 6 pages.

WikiHow, "How to Hang Wall Cabinets" (https://web.archive.org/web/20120414004625/https://www.wikihow.com/Hang-Wall-Cabinets), retrieved on Nov. 22, 2017, published on Apr. 14, 2012 as per Wayback Machine, 3 pages.

Australian Intellectual Property Office, "Examination report No. 2 for standard patent application", in connection with related Australian Patent App. No. 2013308027, dated Nov. 8, 2018, 3 pages.

Hanham, Tanya, Authorized Officer, Canadian Intellectual Property Office, "International Search Report" in connection with related International App. No. PCT/CA2016/051172, dated Feb. 2, 2017, 3 pages.

Perez, Erond, Examiner, Australian Government / IP Australia, "Examination Report No. 1 for Standard Patent Application" in connection with Australian Patent Application No. 2018271312, dated Jun. 6, 2019, 4 pgs.

\* cited by examiner

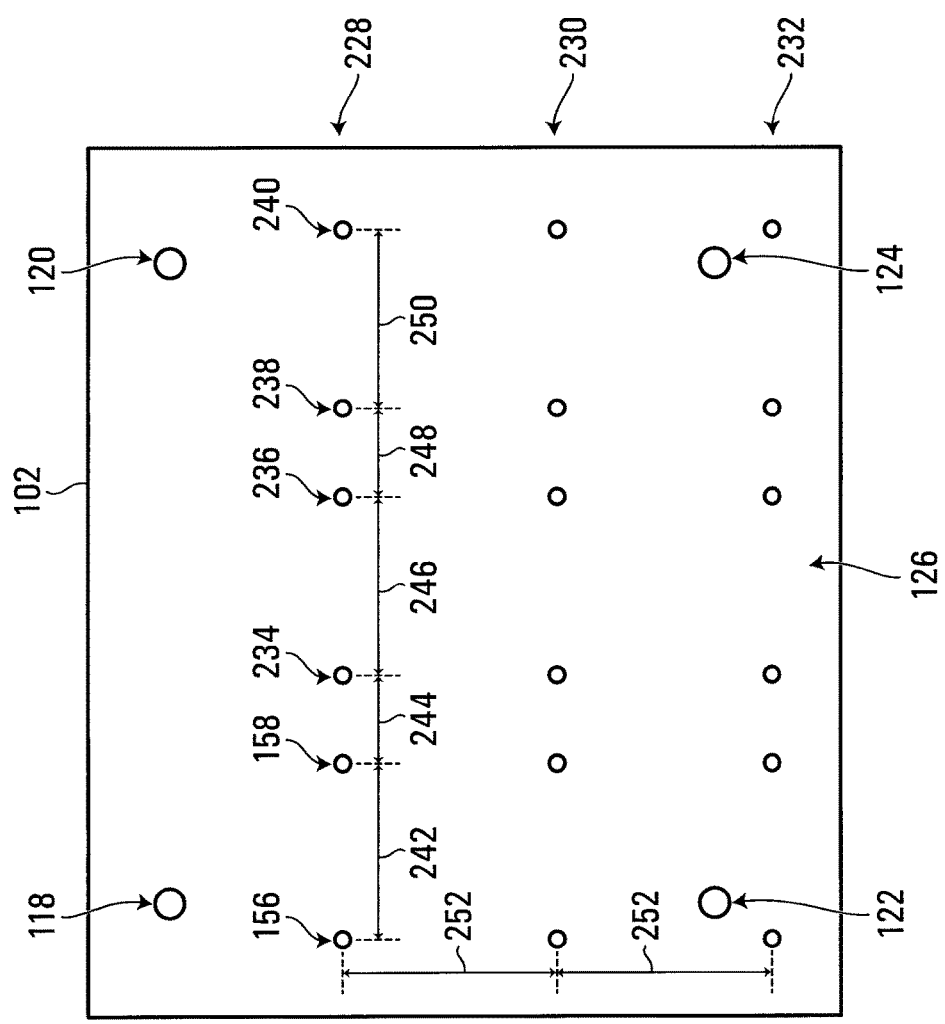

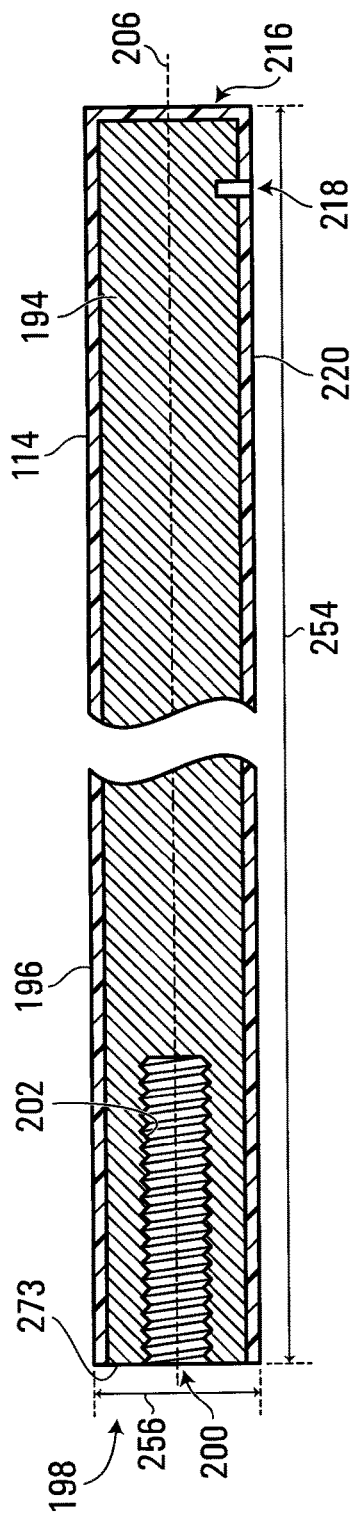
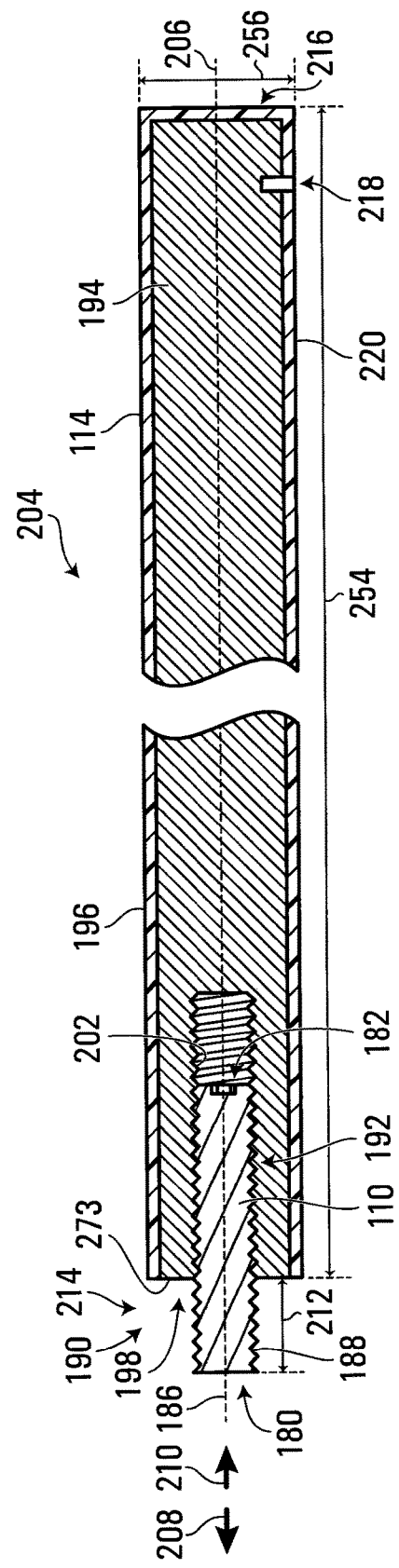
FIG. 8
FIG. 9

METHODS OF MOUNTING CONTAINER SUPPORT BODIES, SYSTEMS, KITS, ASSEMBLIES, AND APPARATUSES INCLUDING SAME, AND USES OF SAME

BACKGROUND

1. Field

This disclosure relates generally to: methods of mounting container support bodies; systems including container support bodies; kits including container support bodies; assemblies including container support bodies; apparatuses including container support bodies; and uses of the systems, kits, assemblies, and apparatuses.

2. Related Art

Storage of containers, such as wine bottles for example, can require particular needs in different circumstances. For example, wine bottles can require storage at particular orientations to preserve corks in the wine bottles, and wine bottles can also require particular temperatures to maintain quality of wine in the wine bottles during storage. Also, aesthetic appeal of wine racks can be desirable in some circumstances.

Some known wine racks may be difficult to assemble or install. For example, assembling one known wine rack involves passing machine bolts through a support member, welding the machine bolts through a support member on a rear side of the support member, and threading wine bottle support rods onto threaded shank ends of the machine bolts on a front side of the support member. Therefore, assembling one known wine rack involves accessing both front and rear sides of the support member, which can add significant delay and cost to installations of some wine racks. Also, if the machine bolts are pre-welded to the support member, then threaded shank ends will protrude from the support member, which may complicate shipping or storage of the support member.

Known wine racks include various materials, but some materials (such as metal) have relatively low coefficients of friction and therefore may not effectively prevent a container such as a wine bottle supported on the wine racks from movement.

SUMMARY

According to one illustrative embodiment, there is provided a method of mounting a container support body to a mounting body, the method comprising: threadedly coupling a first threaded portion of a fastener to the mounting body; and coupling an end portion of the fastener to the container support body in an opening defined by the container support body.

The method may further comprise adjusting a longitudinal position of the fastener in the opening defined by the container support body to adjust a length of a portion of the fastener that extends away from the container support body. The container support body may define internal threads in the opening defined by the container support body.

Adjusting the longitudinal position of the fastener in the opening defined by the container support body may comprise rotating at least one of the container support body and the fastener to move a second threaded portion of the fastener, defining threads complementary to the internal threads, longitudinally in the opening defined by the container support body. Rotating the at least one of the container support body and the fastener may comprise rotating the container support body.

Rotating the container support body may comprise applying a torque from a torque application tool to a tool interface defined by the container support body. The tool interface may comprise an inner surface of a lateral opening defined by the container support body.

The container support body may be generally rotationally symmetric about an axis of rotation of the fastener.

The container support body may have a generally cylindrical outer surface. The container support body may define at least one recess extending transversely across the container support body to receive at least a portion of a container positioned transversely to the container support body. The recess may be sized to receive a portion of a body of a wine bottle positioned transversely to the container support body. The recess may be sized to receive a portion of a neck of a wine bottle positioned transversely to the container support body.

The first threaded portion of the fastener may define wood screw threads. The mounting body may comprise a wood body.

Threadedly coupling the first threaded portion of the fastener to the mounting body may comprise threadedly coupling the first threaded portion of the fastener to the mounting body in a threaded opening defined by the mounting body.

The mounting body may comprise a first panel. The first panel may define the threaded opening defined by the mounting body. The first panel may comprise an insert defining the threaded opening defined by the mounting body.

The method may further comprise mounting a second panel between the container support body and the mounting body. Mounting the second panel between the container support body and the mounting body may comprise mounting the second panel between the container support body and the mounting body only by mounting a plurality of container support bodies comprising the container support body to the mounting body.

The method may further comprise supporting a wine bottle on the container support body. According to another illustrative embodiment, there is provided a container support system comprising: a fastener defining a first threaded portion and having an end portion, the first threaded portion configured to be threadedly coupled to a mounting body; and a container support body defining an opening and configured to be coupled to the fastener when the end portion of the fastener is received in the opening defined by the container support body.

When the end portion of the fastener is received in the opening defined by the container support body, a longitudinal position of the fastener in the opening defined b the container support body may be adjustable to adjust a length of a portion of the fastener that extends away from the container support body.

The container support body may define internal threads in the opening defined by the container support body. The fastener may define a second threaded portion complementary to the internal threads.

The container support body may define a tool interface. The tool interface may comprise an inner surface of a lateral opening defined by the container support body.

The container support body may be generally rotationally symmetric about an axis of rotation of the fastener. The container support body may have a generally cylindrical outer surface.

The container support body may define at least one recess extending transversely across the container support body to receive at least a portion of a container positioned transversely to the container support body. The recess may be sized to receive a portion of a body of a wine bottle positioned transversely to the container support body. The recess may be sized to receive a portion of a neck of a wine bottle positioned transversely to the container support body.

The first threaded portion of the fastener may define wood screw threads. The first threaded portion of the fastener may define machine screw threads.

According to another illustrative embodiment, there is provided use of the system in a wine rack. According to another illustrative embodiment, there is provided a wine rack comprising the system.

According to another illustrative embodiment, there is provided a kit comprising: a plurality of the container support systems; and the mounting body.

According to another illustrative embodiment, there is provided a kit comprising: a plurality of the container support systems; and the mounting body, wherein the mounting body comprises a first panel defining a plurality of threaded openings, each one of the plurality of threaded openings being complementary to the first threaded portion of the fastener of a respective one of the plurality of container support systems.

According to another illustrative embodiment, there is provided a kit comprising a plurality of the container support systems and the mounting body, wherein the mounting body comprises: a first panel; and a plurality of inserts configured to be coupled to the first panel, wherein when each one of the plurality of inserts is coupled to the first panel, each one of the plurality of inserts defines a threaded opening complementary to the first threaded portion of the fastener of a respective one of the plurality of container support systems. The plurality of inserts may be coupled to the first panel.

The kit may further comprise a second panel configured to be mounted between: the respective container support bodies of the plurality of container support systems; and the mounting body.

According to another illustrative embodiment, ere is provided use of the kit for a wine rack.

According to another illustrative embodiment, there is provided a container support assembly comprising: a mounting body; a plurality of fasteners, each one of the plurality of fasteners defining a respective first threaded portion and having a respective end portion, wherein the respective first threaded portion of each one of the plurality of fasteners is threadedly coupled to the mounting body; and a plurality of container support bodies, each one of the plurality of container support bodies defining a respective opening and being coupled to a respective one of the plurality of fasteners with the respective end portion of the respective one of the plurality of fasteners received in the respective opening defined by each one of the plurality of container support bodies.

A longitudinal position of each one of the plurality of fasteners in the respective opening defined by the respective one of the plurality of container support bodies may be adjustable to adjust a length of a portion of each one of the plurality of fasteners that extends away from the respective one of the plurality of container support bodies.

Each one of the plurality of the container support bodies may define internal threads in the respective opening defined by each one of the plurality of the container support bodies. Each one of the plurality of fasteners may define a respective second threaded portion complementary to the internal threads of the respective one of the plurality of the container support bodies.

Each one of the plurality of container support bodies may define a respective tool interface. The respective tool interface of each one of the plurality of container support bodies may comprise a respective inner surface of a lateral opening defined by each one of the plurality of container support bodies.

Each one of the plurality of container support bodies may be generally rotationally symmetric about an axis of rotation of the respective one of the plurality of fasteners.

Each one of the plurality of container support bodies may have a generally cylindrical outer surface.

Each one of the plurality of container support bodies may define a respective at least one recess extending transversely across each one of the plurality of container support bodies to receive at least a portion of a container positioned transversely to each one of the plurality of container support bodies. The respective at least one recess of a first at least one of the plurality of container support bodies may be sized to receive a portion of a body of a wine bottle positioned transversely to the first at least one of the plurality of container support bodies. The respective at least one recess of a second at least one of the plurality of container support bodies may be sized to receive a portion of a neck of a wine bottle positioned transversely to the second at least one of the plurality of container support bodies.

The respective first threaded portion of a first at least one of the plurality of fasteners may define wood screw threads. The mounting body may comprise a wood body. The mounting body may define at least one threaded opening. The respective first threaded portion of a second at least one of the plurality of fasteners may be threadedly coupled to the mounting body in a respective one of the at least one threaded opening defined by the mounting body. The mounting body may comprise a first panel. The first panel may define the at least one threaded opening defined by the mounting body. The mounting body may further comprise at least one insert coupled to the panel and defining the at least one threaded opening defined by the mounting body.

The assembly may further comprise a second panel mounted between the plurality of container support bodies and the mounting body. The second panel may be mounted between the plurality of container support bodies and the mounting body only by the plurality of container support bodies.

According to another illustrative embodiment, there is provided use of the assembly in a wine rack. According to another illustrative embodiment, there is provided a wine rack comprising the assembly.

According to another illustrative embodiment, there is provided a container support apparatus comprising a container support body comprising: a structural body comprising a structural material; and a frictional body on the structural body and comprising a frictional material different from the structural material; wherein the frictional material defines a frictional support surface extending substantially along an entire length of the container support body.

The frictional support surface may be sized to extend longitudinally along a body of a wine bottle when the wine bottle is supported longitudinally by the apparatus.

The structural material may be metallic. The frictional material may be non-metallic. The frictional material may comprise polyurethane or silicone.

The frictional body may be a frictional coating on the structural body. The frictional body may be a cover. The cover may be releasably held on the structural body. The container support body may be generally rotationally symmetric about a longitudinal axis of the container support body. The container support body may have a generally cylindrical outer surface. The container support body may define at least two threaded openings for receiving respective threaded fasteners. According to another illustrative embodiment, there is provided use of the apparatus in a wine rack. According to another illustrative embodiment, there is provided a wine rack comprising the apparatus.

According to another illustrative embodiment, there is provided a container support system comprising at least two generally parallel and spaced-apart container support bodies projecting away from a wall, each one of the at least two container support bodies comprising: a structural body comprising a structural material; and a frictional body on the structural body and comprising a frictional material different from the structural material; wherein the frictional body of each one of the at least two container support bodies defines a respective frictional support surface extending substantially along a respective entire length of each one of the at least two container support bodies.

Two of the at least two container support bodies may be sized and positioned to support a wine bottle positioned longitudinally between the two of the at least two container support bodies. The frictional support surfaces of the two of the at least two container support bodies may be sized and positioned to extend longitudinally along a body of the wine bottle when the wine bottle is supported longitudinally by the two of the at least two container support bodies.

The structural material may be metallic. The frictional material may be non-metallic. The frictional material may comprise polyurethane or silicone. The frictional body of at least one of the at least two container support bodies may be a frictional coating on the structural body of the at least one of the at least two container support bodies. The frictional body of at least one of the at least two container support bodies may be a cover releasably held on the structural body of the at least one of the at least two container support bodies. The cover of the at least one of the at least two container support bodies may be releasably held on two structural bodies.

Each one of the at least two container support bodies may be generally rotationally symmetric about a respective longitudinal axis of each one of the at least two container support bodies. Each one of the at least two container support bodies may have a generally cylindrical outer surface. Each one of the at least two container support bodies may define at least two threaded openings for receiving respective threaded fasteners.

According to another illustrative embodiment, there is provided use of the system for a wine rack. According to another illustrative embodiment, there is provided a wine rack comprising the system.

According to another illustrative embodiment, there is provided a kit comprising: a mounting body; at least two structural bodies each comprising a structural material, wherein the at least two structural bodies are mountable to the mounting body to be generally parallel and spaced-apart when mounted to the mounting body; and at least two frictional bodies each comprising a frictional material different from the structural material, each one of the at least two frictional bodies positionable on a respective one of the at least two structural bodies to form a respective container support body defining a respective frictional support surface of the frictional material extending substantially along a respective entire length of the respective container support body.

When a first two of the at least two structural bodies are mounted to the mounting body, and when two of the at least two frictional bodies are positioned on respective ones of the first two of the at least two structural bodies to form respective container support bodies, the respective container support bodies may be sized and positioned to support a wine bottle positioned longitudinally between the respective container support bodies. When the first two of the at least two structural bodies are mounted to the mounting body, and when the two of the at least two frictional bodies are positioned on the respective ones of the first two of the at least two structural bodies to form the respective container support bodies, the frictional support surfaces may be sized and positioned to extend longitudinally along a body of the wine bottle when the wine bottle is supported longitudinally by the respective container support bodies.

The structural material may be metallic. The frictional material may be non-metallic. The frictional material may comprise polyurethane or silicone. At least one of the at least two frictional bodies may be a frictional coating on the respective one of the at least two structural bodies. At least one of the at least two frictional bodies may be a cover. The cover may be releasably positionable on the respective one of the at least two structural bodies. The cover may be releasably positionable on a second two of the at least two structural bodies. Each one of the container support bodies may be generally rotationally symmetric about a respective longitudinal axis of each one of the container support bodies. Each one of the container support bodies may have a generally cylindrical outer surface. Each one of the at least two container support bodies may define at least two threaded openings for receiving respective threaded fasteners. According to another illustrative embodiment, there is provided use of the kit for a wine rack.

Other aspects and features will become apparent to those ordinarily skilled in the art upon review of the following description of illustrative embodiments in conjunction with the accompanying figures.

BRIEF DESCRIPTION OF THE DRAWINGS

In drawings of illustrative embodiments:

FIG. 2 is a front elevation view of a first panel of the container support assembly of FIG. 1;

FIG. 8 is a cross-sectional view of the container support body of FIG. 7, taken along the line VIII-VIII shown in FIG. 7;

FIG. 9 is a perspective view of a container support system of the container support assembly of FIG. 1, including the fastener of FIG. 6 and the container support body of FIG. 7;

DETAILED DESCRIPTION

Figure 1:
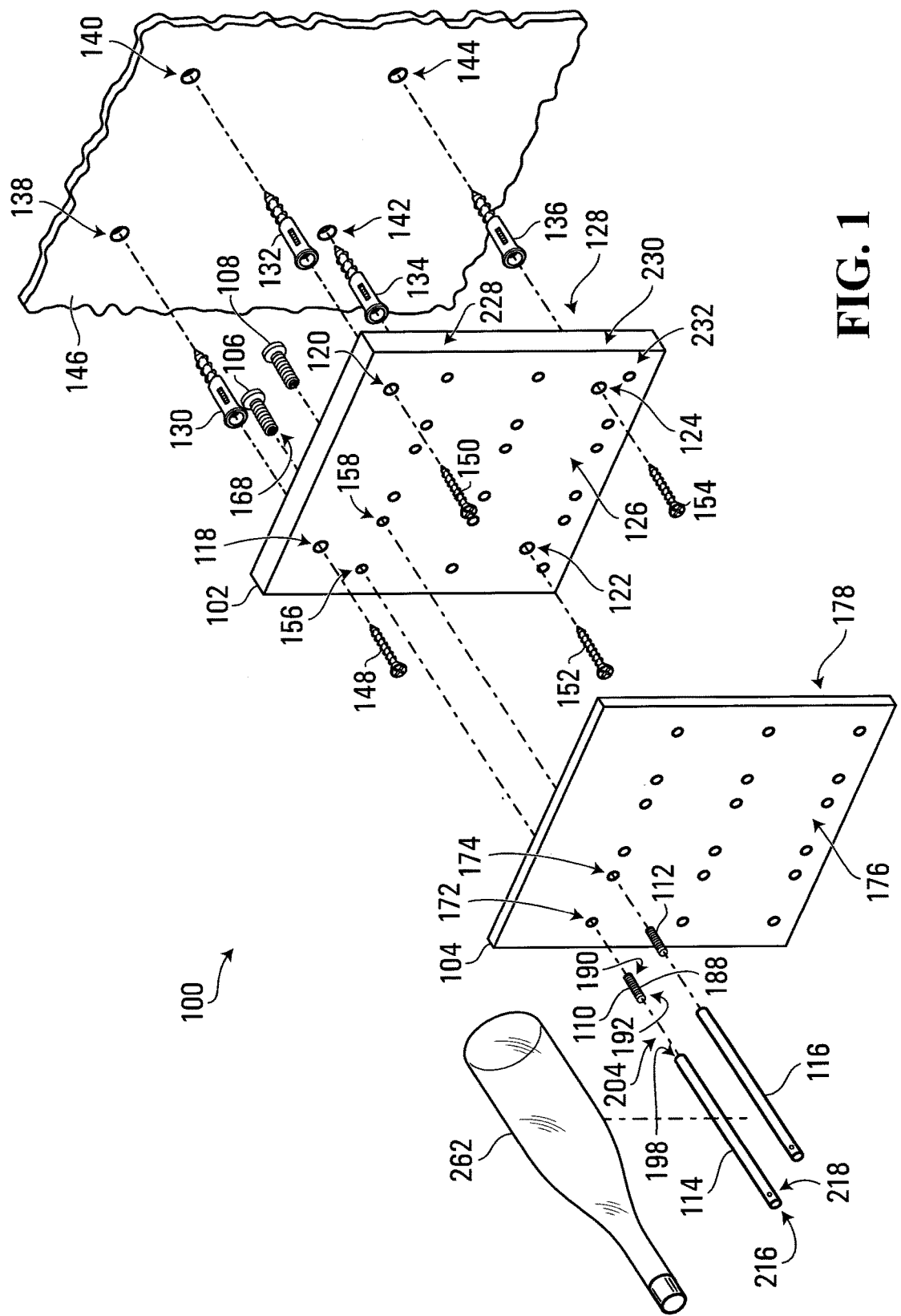
FIG. 1 is an exploded perspective view of a container support assembly according to an illustrative embodiment.

Referring to FIG. 1, a container support assembly according to an illustrative embodiment is shown generally at 100 and includes a panel 102, a panel 104, an insert 106, an insert 108, a fastener 10, a fastener 112, a container support body 114, and a container support body 116. Referring to FIGS. 1 and 2, the panel 102 defines through-openings shown generally at 118, 120, 122, and 124 in respective corners of the panel 102 and extending between a front side shown generally at 126 of the panel 102 and a rear side shown generally at 128 of the panel 102 opposite the front side 126. As shown in FIG. 1, drywall anchors 130, 132, 134, and 136 may be fastened in respective openings shown generally at 138, 140, 142, and 144 of a drywall panel 146 of a wall. For example, the panel 102 may be positioned against the drywall panel 146 and leveled with a level (not shown), and then locations for the openings 138, 140, 142, and 144 may be marked by passing a pencil through each of the through-openings 118, 120, 122, and 124. The openings 138, 140, 142, and 144 may then be drilled when the panel 102 is temporarily removed from the drywall panel 146 by drilling where indicated by the markings. Then, the panel 102 may be repositioned against the drywall panel 146 and fasteners 148, 150, 152, and 154 may pass through the through-openings 118, 120, 122, and 124 respectively and be threadedly coupled to the drywall anchors 130, 132, 134, and 136 respectively to mount the panel 102 to the drywall panel 146. The panel 102 is thus mountable to a wall, which in various embodiments may be a wall of a home, restaurant, or other building for example. Although the embodiment shown includes drywall anchors 130, 132, 134, and 136 and the drywall panel 146, the panel 102 in alternative embodiments may be mounted to other walls in other ways, such as to a concrete wall, a brick wall, or a wood wall, for example. More generally, the panel 102 is a wall-mountable panel. In the embodiment shown, the panel 102 is formed from ¾-inch-thick medium-density fiberboard ("MDF"), but may be formed of one or more of MDF, plywood such as ¾-inch thick low-VOC (volatile organic compound) or no added urea formaldehyde ("NAUF") plywood, other wood products, and other materials in alternative embodiments.

Figure 4:
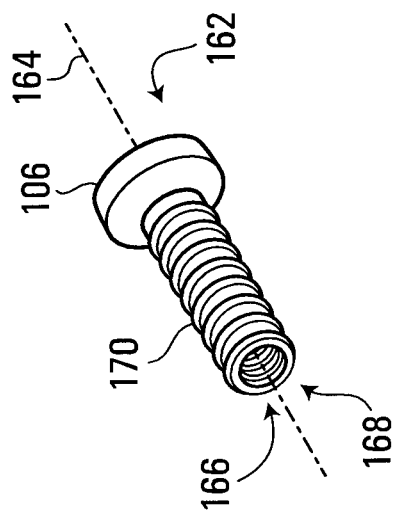
FIG. 4 is a rear perspective view of the insert of FIG. 3.
Figure 3:
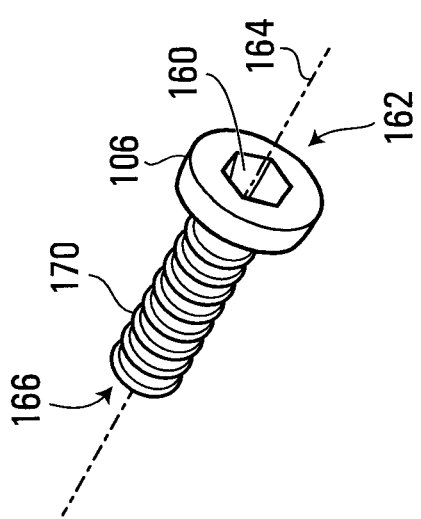
FIG. 3 is a front perspective view of an insert of the container support assembly of FIG. 1.

Before mounting the panel 102 to the drywall panel 146, the inserts 106 and 108 may be threadedly inserted from the rear side 128 of the panel 102 into respective through-openings shown generally at 156 and 158 extending between the front side 126 and the rear side 128 of the panel 102. Referring to FIGS. 3 and 4, the insert 106 includes a tool interface 160 on a front end shown generally at 162 of the insert 106. The tool interface 160 is shaped to receive a hex key (not shown) and to receive a torque from the hex key to rotate the insert 106 about an axis of rotation 164. However, alternative embodiments may define different tool interfaces or may receive a torque without a tool interface, such as from a drill chuck (not shown) for example. At a rear end shown generally at 166 opposite the front end 162, the insert 106 defines internal threads of a threaded opening shown generally at 168. The internal threads of the threaded opening 168 are ¼-20 machine threads, but may be different threads in alternative embodiments. Between the front end 162 and the rear end 166, the insert 106 defines external threads 170 to engage an inner surface of the through-opening 156 to facilitate threadedly inserting the insert 106 into the through-opening 156 of the panel 102 (shown in FIGS. 1 and 2) to couple the insert 106 to the panel 102. When the insert 106 is inserted from the rear side 128 of the panel 102 and coupled to the panel 102, the threaded opening 168 is exposed on the front side 126 of the panel 102. The insert 108 (shown in FIG. 1) in the embodiment shown is substantially similar to the insert 106 and may be similarly inserted in the through-opening 158 of the panel 102 (shown in FIGS. 1 and 2) to couple the insert 108 to the panel 102. In Some embodiments, the insert 106 may be an E-Z LOK™ threaded insert identified as catalog number 801420-13 from Tool Components, Inc., doing business as E-Z LOK Corporation, of Gardena Calif., United States of America.

Figure 5:
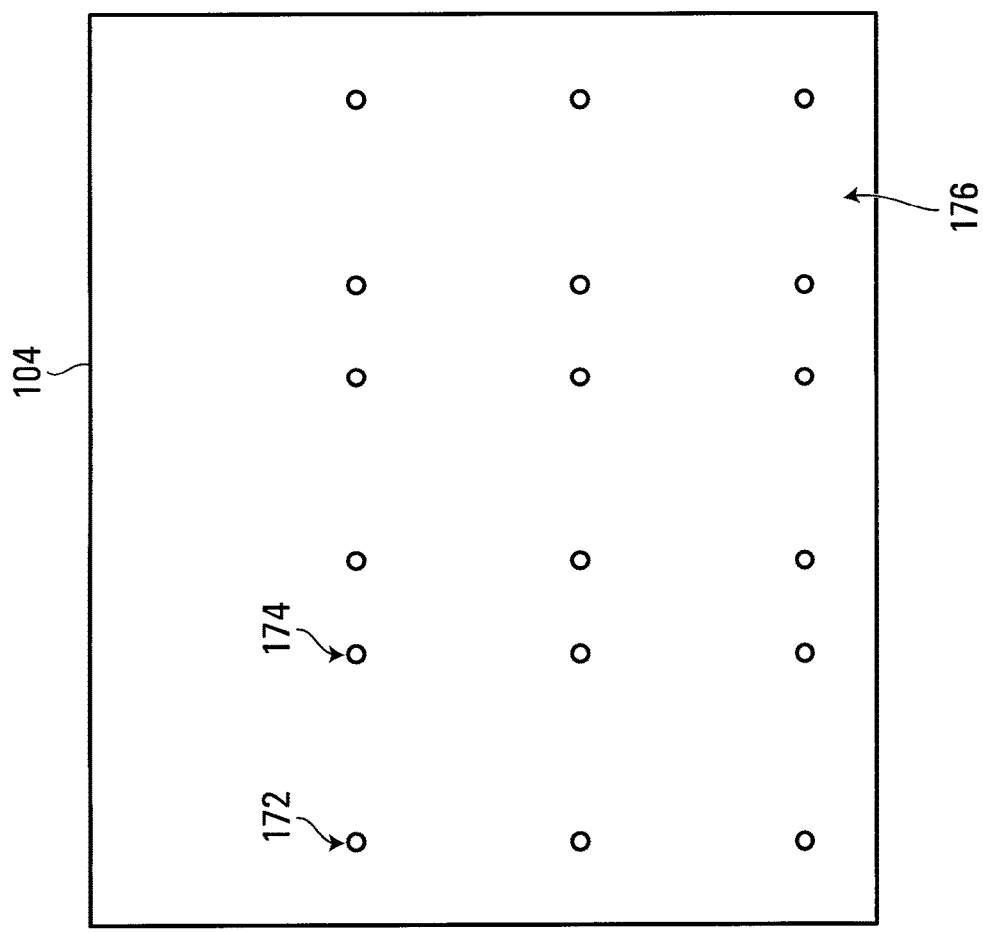
FIG. 5 is a front elevation view of a second panel of the container support assembly of FIG. 1.

Referring to FIGS. 1 and 5, the panel 104 defines through-openings shown generally at 172 and 174 extending between a front side shown generally at 176 of the panel 104 and a rear side shown generally at 178 of the panel 104 opposite the front side 176. The through-openings 172 and 174 are aligned with the through-openings 156 and 158 such that when the rear side 178 of the panel 104 is positioned adjacent the front side 126 of the panel 102, the fastener 110 may pass through the through-openings 172 and 156 and the fastener 112 may pass through the through-openings 174 and 158. In the embodiment shown, the panel 104 is formed from acrylic with a decorative appearance (such as a wood grain appearance, solid color, or other appearance) on the front side 176, but may be formed of one or more of thermoplastic materials, metallic materials, wood materials, and other materials in alternative embodiments. In other alternative embodiments, the panel 104 may be omitted.

Figure 6:
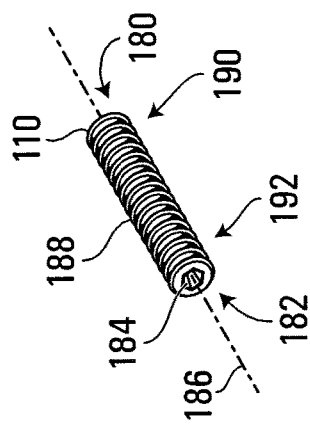
FIG. 6 is a perspective view of a fastener of the container support assembly of FIG. 1.

Referring to FIG. 6, the fastener 110 is a stud bolt having a first end shown generally at 180 and a second end shown generally at 182 opposite the first end 180. At the second end 182, the fastener 110 includes a tool interface 184 shaped to receive a hex key (not shown) and to receive a torque from the hex key to rotate the fastener 110 about an axis of rotation 186. However, alternative embodiments may define different tool interfaces or may receive a torque without a tool interface, such as from a drill chuck (not shown) for example. An external surface of the fastener 110 defines external threads 188 in a first threaded portion shown generally at 190 and proximate the first end 180, and in a second threaded portion shown generally at 192 and proximate the second end 182. The external threads 188 in the first threaded portion 190 are complementary to the internal threads of the threaded opening 168 (shown in FIG. 4). The first threaded portion 190 is therefore configured to be threadedly coupled to the insert 106 (shown in FIGS. 1 3, 4, and 12). In the embodiment shown, the fastener 110 is about 1 inch or about 2.54 centimeters ("cm") long and the external threads 188 are ¼-20 machine threads that are uniform across the first and second threaded portions 190 and 192, but in alternative embodiments, the external threads 188 may be different threads, and the external threads 188 in the first threaded portion 190 may differ from the external threads 188 in the second threaded portion 192. The fastener 112 (shown in FIG. 1) in the embodiment shown is substantially similar to the fastener 110.

Figure 7:
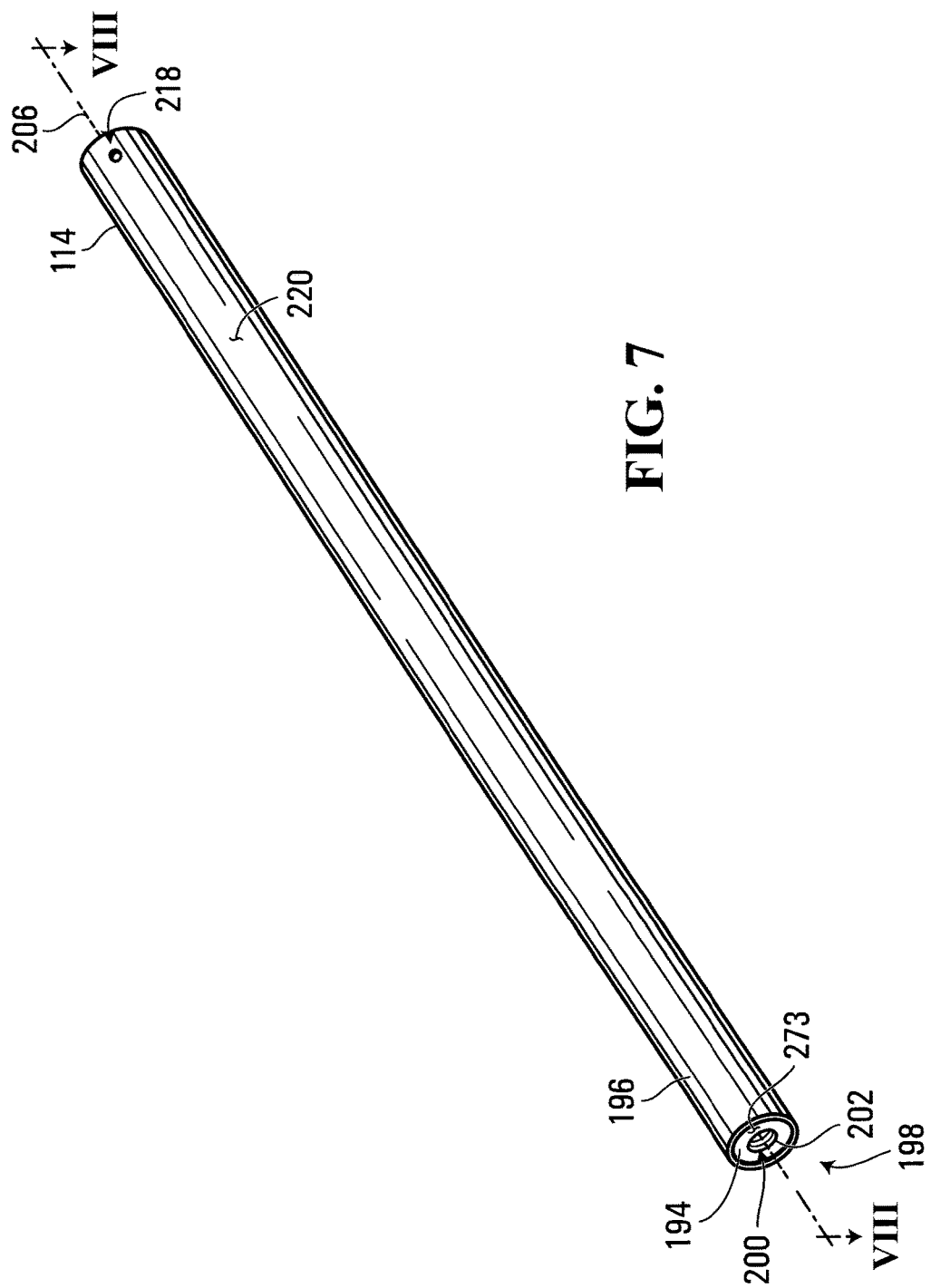
FIG. 7 is a perspective view of a container support body of the container support assembly of FIG. 1.

Referring to FIGS. 7 and 8, the container support body 114 includes a structural body 194 and a frictional coating 196 (or, more generally, a frictional body) on the structural body 194. In the embodiment shown, the structural body 194 is formed of brushed aluminum, but the structural body 194 may be formed of other metals, or more generally other structural materials, in alternative embodiments. Also, in the embodiment shown, the frictional coating 196 is a polyurethane coating such as a coating of Velvecron™ available from PPG Industries, Inc. of Pittsburgh, Pa., United States of America, but the frictional coating 196 may be formed of other non-metallic materials, or more generally other frictional materials, in alternative embodiments. At a first end shown generally at 198, the structural body 194 defines an opening shown generally at 200. The structural body 194 defines internal threads 202 in the opening 200, and the external threads 188 in the second threaded portion 192 of the fastener 110 are complementary to the internal threads 202. In the embodiment shown, the opening 200 has a maximum depth of about 1.125 inches or about 28.6 millimeters ("mm"), and the internal threads 202 extend for a length of at least about 0.875 inches (or at least about 22.2 mm) into the opening 200. The container support body 114 is thus configured to be coupled to the fastener 110 when an end portion of the fastener 110 including the second end 182 and the second threaded portion 192 is received in the opening 200 defined by the container support body 114.

Referring to FIG. 9, a container support system is shown generally at 204 and includes the fastener 110 and the container support body 114. As shown in FIG. 9, the end portion (including the second end 182 and the second threaded portion 192) of the fastener 110 is threadedly received in the opening 200, and the container support body 114 is thus configured to be coupled to the fastener 110 when the end portion of the fastener 110 is received in the opening 200. If the fastener 110 is rotated about the axis of rotation 186, or if the container support body 114 is rotated about an axis of rotation 206 of the container support body 114, then the interaction of the external threads 188 in the second threaded portion 192 of the fastener 110 and of the internal threads 202 causes the fastener 110 to move relative to the container support body 114 longitudinally, namely in a direction indicated by the arrow 208 or in a direction indicated by the arrow 210 opposite the direction indicated by the arrow 208, in the opening 200. As such, rotation of one or both of the fastener 110 about the axis of rotation 186 and of the container support body 114 about the axis of rotation 206 adjusts a longitudinal position of the fastener 110 in the opening 200 defined by the container support body 114 and thereby adjusts a length 212 of a portion shown generally at 214 of the fastener 110 that extends away from the container support body 114. In various embodiments, "adjusting" such a distance may refer generally to varying a position in which such an end portion of a fastener is held in an opening.

Figure 10:
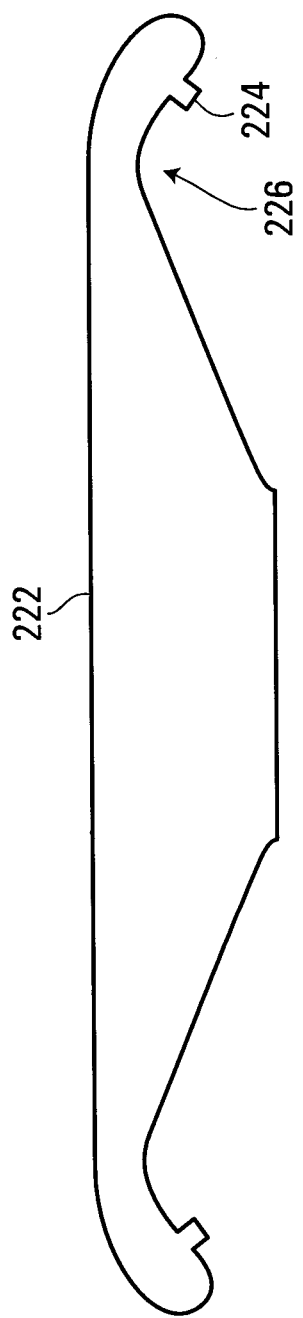
FIG. 10 is a plan view of a wrench according to an illustrative embodiment.

At a second end shown generally at 216 opposite the first end 198, the container support body 114 defines a lateral opening 218 extending radially towards an outer surface 220 of the container support body 114. An inner surface of the lateral opening 218 may contact a tool, such as a wrench 222 shown in FIG. 10 according to one illustrative embodiment, which is a standoff wrench for ¾-inch and 1¼-inch standoff cap assemblies identified as catalog number SOW from C.R. Laurence Co., Inc. of Los Angeles, Calif., United States of America. The wrench 222 includes a projection 224 projecting into a space shown generally at 226 for receiving a portion of the container support body 114 when the projection 224 is positioned in the lateral opening 218, and the wrench 222 may apply a torque to the container support body 114 to rotate the container support body 114 about the axis of rotation 206.

Referring back to FIG. 1, once the inserts 106 and 108 are threadedly inserted the from the rear side 128 of the panel 102 into the through-openings 156 and 158 and thus coupled to the panel 102, the panel 102 may be mounted to the drywall panel 146 by passing the fasteners 148, 150, 152, and 154 through the through-openings 118, 120, 122, and 124 respectively and threadedly coupling the fasteners 148, 150, 152, and 154 to the drywall anchors 130, 132, 134, and 136 respectively. Then, the rear side 178 of the panel 104 may be positioned adjacent the front side 126 of the panel 102, the external threads 188 in the first threaded portion 190 of the fastener 110 may be threadedly received in the threaded opening 168 to couple the fastener 110 to the insert 106, and the external threads 188 in the second threaded portion 192 of the fastener 110 may be threadedly received in the opening 200 (shown in FIGS. 7 and 8) of the container support body 114. The container support body 114 may be rotated about the axis of rotation 206 (shown in FIGS. 7 to 9) until the external threads 188 in the first threaded portion 190 of the fastener 110 are tightly received in the threaded opening 168 and the external threads 188 in the second threaded portion 192 of the fastener 110 are tightly received in the opening 200 (shown in FIGS. 7 and 8). Accordingly, the container support body 114 may be mounted to the insert 106 and to the panel 104 by threadedly coupling the first threaded portion 190 of the fastener 110 in the threaded opening 168 of the insert 106 and by coupling an end portion of the fastener 110 including the second end 182 and the second threaded portion 192 to the container support body 114 in the opening 200 defined by the container support body 114, and the panel 104 and the insert 106 coupled to the panel 104 collectively function as a mounting body. The container support body 116 may similarly be mounted to the insert 108 and to the panel 104 using the fastener 112.

Referring back to FIG. 2, the panel 102 defines through-openings in addition to the through-openings 156 and 158, and in general, each such additional through opening can also facilitate mounting a respective container support body as described above. In the embodiment shown, the panel 102 defines through-openings in three rows shown generally at 228, 230, and 232. Further, each of the through-openings of the rows 228, 230, and 232 of the panel 102 may threadedly receive a respective insert substantially similar to the insert 106 (shown in FIGS. 3 and 4) from the rear side 128 (shown in FIG. 1) of the panel 102 to couple the respective insert to the panel 102. The row 228 includes the through-openings 156 and 158, and also includes through-openings shown generally at 234, 236, 238, and 240, all of which also extend between the front side 126 and the rear side 128 (shown in FIG. 1) of the panel 102. Centers of the through-openings 156 and 158 are separated from each other by a horizontal spacing distance 242, centers of the through-openings 158 and 234 are separated from each other by a horizontal spacing distance 244, centers of the through-openings 234 and 236 are separated from each other by a horizontal spacing distance 246, centers of the through-openings 236 and 238 are separated from each other by a horizontal spacing distance 248, and centers of the through-openings 238 and 240 are separated from each other by a horizontal spacing distance 250. In the embodiment shown, the horizontal spacing distances 242, 246, and 250 are about 64 mm or about 2.5 inches, and the horizontal spacing distances 244 and 248 are about 32 mm or about 1.25 inches. Each of the rows 230 and 232 in the embodiment shown includes through-openings corresponding to respective through-openings of the row 228, except that the through-openings of the row 230 are spaced by a consistent distance 252 (such as about 3.75 inches or about 9.5 cm, for example) below the respective through-openings of the row 228 and the through-openings of the row 232 are spaced by the same consistent distance 252 below the respective through-openings of the row 230. Alternative embodiments may include different numbers of through-openings and different spacings between the through-openings.

Figure 11:
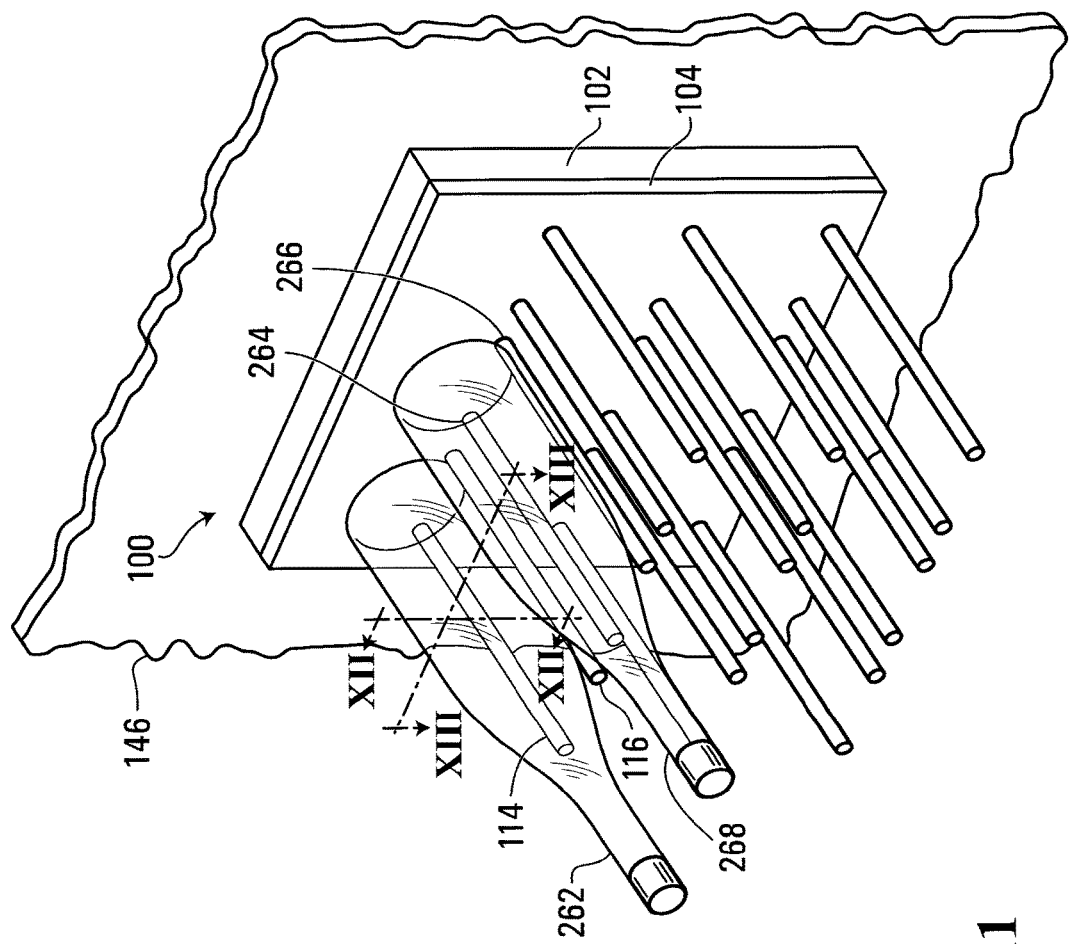
FIG. 11 is an assembled perspective view of the container support assembly of FIG. 1.

Referring to FIGS. 1, 2 and 5, the panel 104 also defines additional through-openings, and in general, the through-openings defined by the panel 104 extend between the front side 176 and the rear side 178 of the panel 104 and are aligned with respective through-openings in the rows 228, 230, and 232 of the panel 102 such that when the rear side 178 of the panel 104 is positioned adjacent the front side 126 of the panel 102, fasteners substantially similar to the fastener 110 may pass through respective through-openings of the panel 104 and through respective through-openings of the panel 102. Such fasteners may then be coupled to respective inserts (substantially similar to the insert 106 shown in FIGS. 3 and 4) threadedly received in the respective through-openings of the panel 102, and to respective container support bodies (substantially similar to the container support body 114 shown in FIGS. 7 and 8) as described above. As such, as shown in FIG. 11, the container support assembly 100 may include a plurality of container support bodies mounted to a mounting body including the panel 102 and respective threaded inserts coupled to the panel 102, and the panel 104 may be mounted between the plurality of container support bodies and the mounting body. Alternative embodiments may include more or fewer container support bodies. Also, although the panels 102 and 104 are shown in FIG. 11 covering only a portion of the drywall panel 146, such panels in alternative embodiments may be sized differently and may cover an entire drywall panel to conceal the drywall panel from sight. In other alternative embodiments, a decorative trim or additional drywall panels (not shown) may surround the panels 102 and 104 to conceal edges of the panels 102 and 104 from sight.

Figure 12:
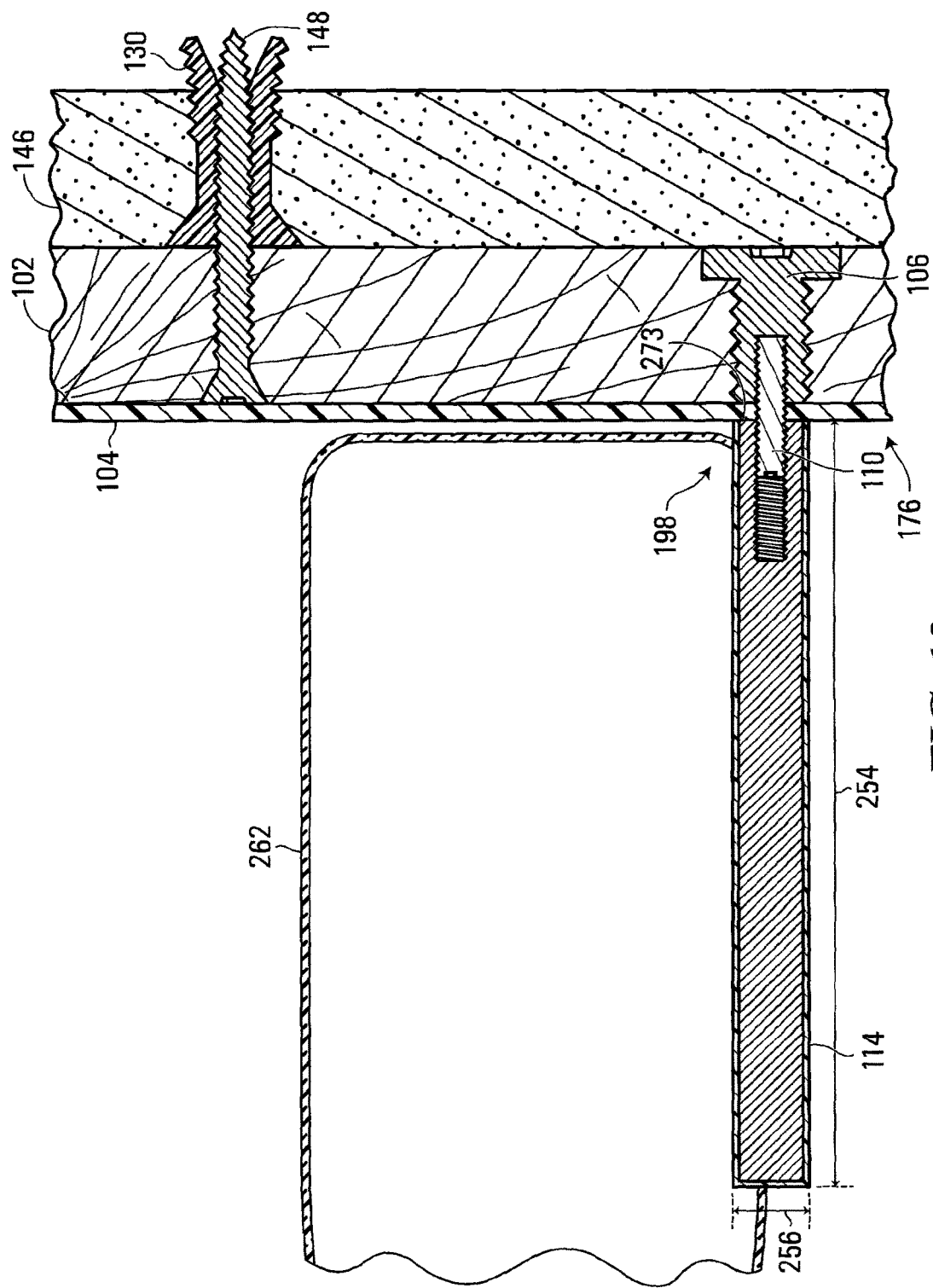
FIG. 12 is a cross-sectional view of the container support assembly of FIG. 1, taken along the line XII-XII shown in FIG. 11.
Figure 13:
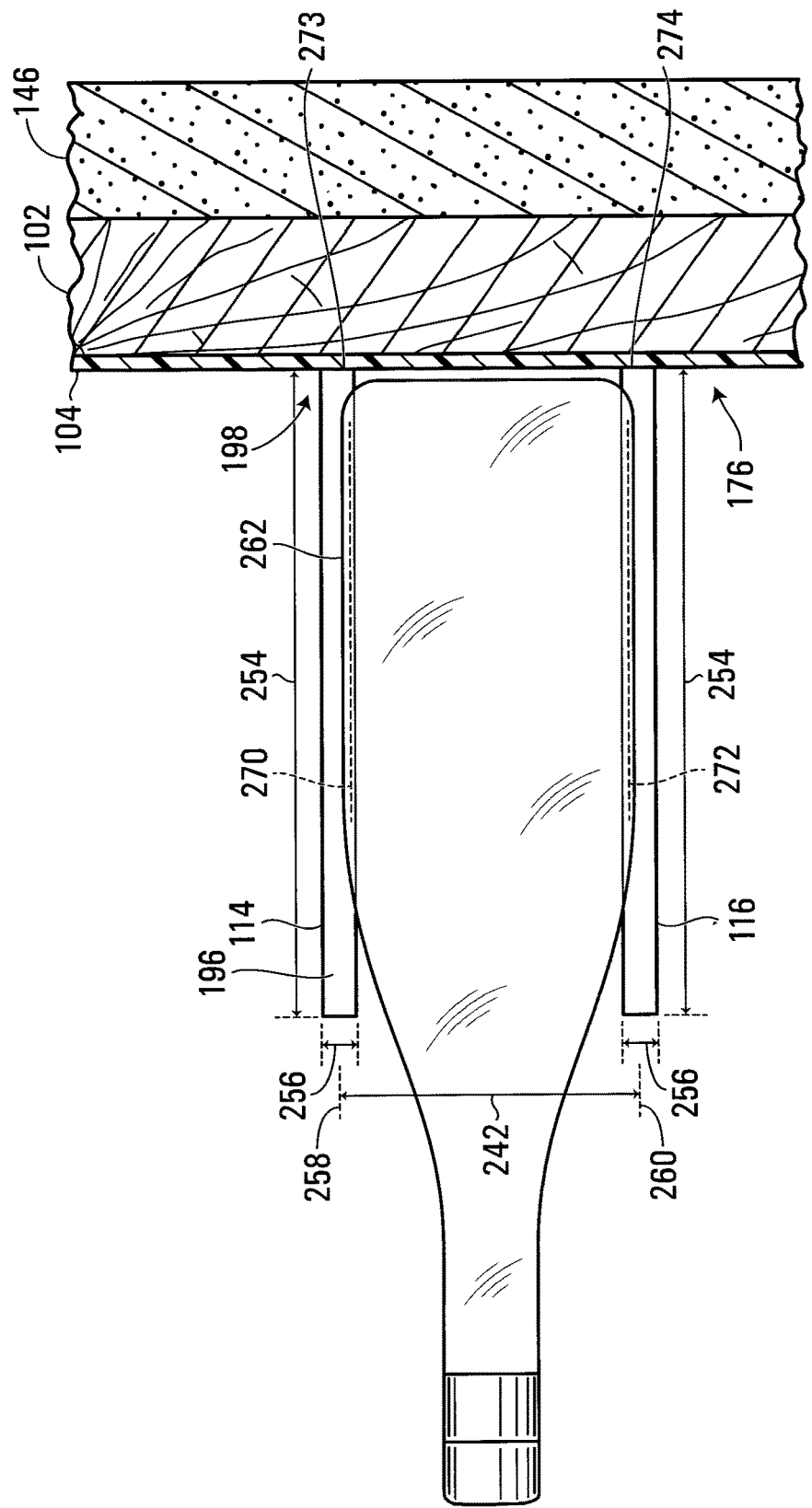
FIG. 13 is a cross-sectional view of the container support assembly of FIG. 1, taken along the line XIII-XIII shown in FIG. 11.

Referring to FIGS. 8, 9, and 11 to 13, the container support body 114 and the other container support bodies have a generally cylindrical shape with a length 254 of about 7 inches (or about 17.8 cm). Further, the structural body 194 may have a diameter of about 0.495 inches (or about 12.5 mm) so that the container support body 114 (including the frictional coating 196) has a diameter 256 of about 0.5 inches (or about 12.7 mm). As shown in FIGS. 12 and 13, the container support bodies 114 and 116 extend by their length 254 away from the panel 104. Further, axial center lines 258 and 260 of the container support bodies 114 and 116 are spaced apart by the horizontal spacing distance 242 (also shown in FIG. 2). As such, when the container support bodies 114 and 116 are mounted to the inserts 106 and 108 (shown in FIG. 1) respectively and to the panel 102, the container support bodies 114 and 116 are sized and positioned to support a container such as a 750 milliliter ("mL") wine bottle 262 when the wine bottle 262 is positioned longitudinally between the container support bodies 114 and 116 as shown in FIGS. 11 to 13. Likewise, container support bodies 264 and 266 (positioned in front of the through-openings 234 and 236 respectively shown in FIG. 2) support another 750 ml wine bottle 268 positioned longitudinally between the container support bodies 264 and 266 as shown in FIG. 11. In alternative embodiments, the plurality of container support bodies may be sized and positioned differently to support one or more wine bottles or different containers.

In the embodiment shown in FIG. 13, when the wine bottle 262 is positioned longitudinally between the container support bodies 114 and 116, a body of the wine bottle 262 contacts the container support body 114 along a longitudinal portion 270 of the frictional coating 196 of the container support body 114, and the body of the wine bottle 262 also contacts the container support body 116 along a longitudinal portion 272 of the frictional coating of the container support body 116. Therefore, the frictional coatings in the embodiment shown are sized to extend longitudinally along a body of a wine bottle when the wine bottle is supported longitudinally by the container support bodies 114 and 116. The frictional coatings of the container support bodies 114 and 116 extend substantially along the entire lengths 254 of the container support bodies 114 and 116, so the longitudinal portions 270 and 272 of the frictional coatings of the container support bodies 114 and 116 are on frictional support surfaces extending substantially along the entire lengths 254 of the container support bodies 114 and 116.

The container support bodies 114 and 116 are generally rotationally symmetric about their respective axes of rotation (such as the axis of rotation 206 shown in FIGS. 7 to 9) and about axes of rotation of fasteners threadedly received in openings defined by the container support bodies (such as the axis of rotation 186 shown in FIG. 9), and accordingly the longitudinal portions 270 and 272 of the frictional coatings of the container support bodies 114 and 116 may be any longitudinal portions of the frictional coatings depending on what portions of the frictional coatings face the wine bottle 262 when the container support bodies 114 and 116 are mounted as described above. Herein, "generally rotationally symmetric" does not require exact rotational symmetry, and may for example include embodiments with rotational asymmetries such as the lateral opening 218 (shown in FIGS. 7 to 9). With reference to a container support body, "generally rotationally symmetric" herein may refer to embodiments in which a container may be supported substantially regardless of an axial rotational position of the container support body.

As shown in FIGS. 12 and 13, an end surface 273 at the first end 198 of the container support body 114, and a corresponding end surface 274 of the container support body 116, are positioned against the front side 176 of the panel 104 and hold the panel 104 against the panel 102. Likewise, each one of the plurality of container support bodies shown in FIG. 11 can hold the panel 104 against the panel 102. As such, the panel 104 may be mounted between the plurality of container support bodies and the panel 102 only by mounting the plurality of container support bodies as described above.

The panels 102 and 104 may be referred to as "3×3" panels because each of those panels is sized and configured to support enough container support bodies to support up to three wine bottles in each of three rows, or up to nine wine bottles. In some embodiments, such "3×3" panels may have widths and heights of about 11.25 inches or about 28.6 cm). However, panels in alternative embodiments may be sized differently and may be configured to support different numbers of container support bodies. For example, "6×2" panels may be configured to support 12 container support bodies in each of two rows to support up to six wine bottles in each of the rows or up to 12 wine bottles overall, and "6×2" panels may be about 22.5 inches (or about 57.2 cm) wide and about 7.5 inches (or about 19.1 cm) high. As another example, "6×1" panels may be configured to support 12 container support bodies in one row to support up to six wine bottles in the row, and "6×1" panels may be about 22.5 inches (or about 57.2 cm) wide and about 3.75 inches (or about 9.5 cm) high. As another example, "2×6" panels may be configured to support four container support bodies in each of six rows to support up to two wine bottles in each of the rows or up to 12 wine bottles overall, and "2×6" panels may be about 7.5 inches (or about 19.1 cm) wide and about 22.5 inches (or about 57.2 cm) high. As another example, "1×6" panels may be configured to support two container support bodies in each of six rows to support one wine bottle in each of the rows or up to six wine bottles overall, and "1×6" panels may be about 3.75 inches (or about 9.5 cm) wide and about 22.5 inches (or about 57.2 cm) high. Still other examples may include differently sized panels configured to support different numbers of container support bodies.

Further, although the embodiment shown includes only the panels 102 and 104, alternative embodiments may include different panels and combinations of substantially similar or different panels. For example, "3×3" panels may be mounted adjacent other "3×3" panels to create a container support assembly to support up to 18 wine bottles. As another example, "3×3" panels may be mounted above other "3×3" panels and "2×6" panels may be mounted beside the "3×3" panels to create a container support assembly to support up to 30 wine bottles. Various embodiments may include numerous combinations of such substantially similar or different panels, and therefore container support assemblies including such panels, such as the container support assemblies described herein, may generally be referred to as "modular" container support assemblies that can cover various different sizes of walls.

Figure 14:
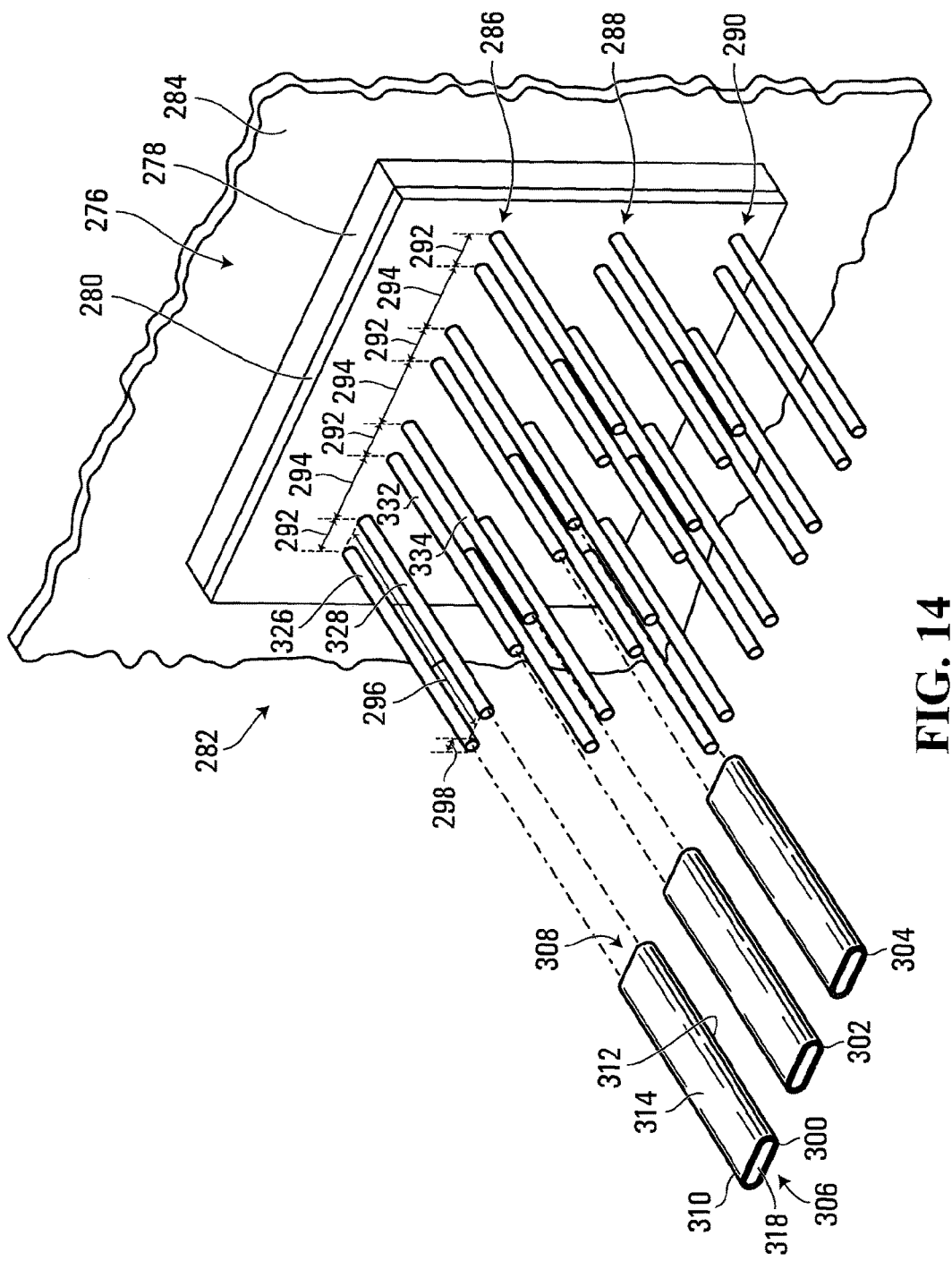
FIG. 14 is a partially exploded perspective view of a container support assembly according to another illustrative embodiment.

Referring to FIG. 14, a container support assembly according to another illustrative embodiment is shown generally at 276 and includes a panel 278, a panel 280, and a plurality of structural bodies shown generally at 282. The panel 278 is substantially similar to the panel 102 (shown in FIGS. 1 and 2) and may be mounted to a drywall panel 284 (or to another wall) as described above. Each one of the structural bodies 282 is substantially similar to the structural body 194 (shown in FIGS. 7 to 9) and may be mounted as described above. The panel 280 is substantially similar to the panel 104 and may be mounted between the structural bodies 282 and the panel 278 as described above. Also, although the panels 278 and 280 are shown in FIG. 14 covering only a portion of the drywall panel 284, such panels in alternative embodiments may be sized differently and may cover an entire drywall panel to conceal the drywall panel from sight. In other alternative embodiments, a decorative trim or additional drywall panels (not shown) may surround the panels 278 and 280 to conceal edges of the panels 278 and 280 from sight.

However, the container support assembly 276 includes more structural bodies 282 than the container support assembly 100, as shown in FIG. 14. More particularly, the structural bodies 282 are in three rows shown generally at 286, 288, and 290, and each of the rows 286, 288, and 290 includes structural bodies separated from each other by horizontal spacing distances (measured from centers of the container support bodies) that alternate between a horizontal spacing distance 292 and a horizontal spacing distance 294. In the embodiment shown, the horizontal spacing distance 292 is about 32 mm or about 1.25 inches, and the horizontal spacing distance 294 is about 64 mm or about 2.5 inches. Also in the embodiment shown, the structural bodies 282 have a generally cylindrical shape with a length 296 of about 7 inches (or about 17.8 cm) and a diameter 298 of about 0.375 inches (or about 9.5 mm). In alternative embodiments, the plurality of structural bodies may be sized and positioned differently, and alternative embodiments may include more or fewer container support bodies.

Figure 15:
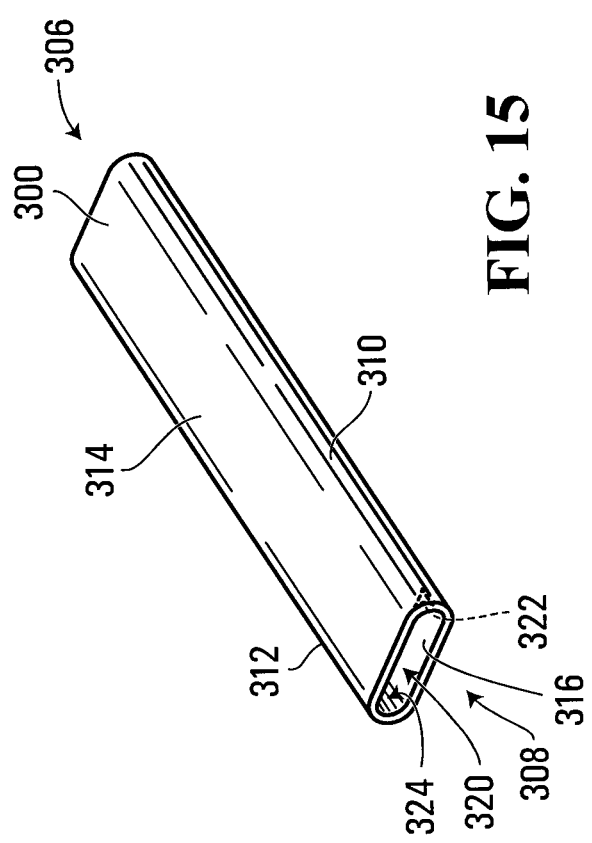
FIG. 15 is a rear perspective view of a cover of the container support assembly of FIG. 14.

The container support assembly 276 also includes a plurality of covers such as covers 300, 302, and 304. Referring to FIGS. 14 and 15, the cover 300 has a front end shown generally at 306 and a rear end shown generally at 308 and opposite the front end 306, and the cover 300 includes generally semi-circular walls 310 and 312 extending between the front end 306 and the rear end 308, generally planar parallel and spaced-apart walls 314 and 316 extending between the generally semi-circular walls 310 and 312 and between the front end 306 and the rear end 308, and an end wall 318 at the front end 306 and extending between the generally semi-circular walls 310 and 312 and the generally planar parallel and spaced-apart walls 314 and 316. The generally semi-circular walls 310 and 312, the generally planar parallel and spaced-apart walls 314 and 316, and the end wall 318 define an opening shown generally at 320, and in the opening 320, inner surfaces 322 and 324 of the generally semi-circular walls 310 and 312 respectively are positioned to contact frictionally outer surfaces of structural bodies 326 and 328 respectively. The cover 300 may thus cover the two structural bodies 326 and 328, and a frictional fit between the inner surfaces 322 and 324 and the outer surfaces of the structural bodies 326 and 328 releasably holds the cover 300 over the two structural bodies 326 and 328. The cover 300 in the embodiment shown is molded of a frictional material such as silicone, polytetrafluoroethylene, or polyurethane, but the covers may be formed in other ways and may be formed of other nonmetallic materials, or more generally other frictional materials or other materials, in alternative embodiments. The covers 302 and 304 in the in the embodiment shown are substantially similar to the cover 300.

The walls of the cover 300 have a thickness of about 0.0625 inches (or about 1.6 mm) so that the combined diameter of one of the structural bodies 282 and one of the generally semi-circular walls 310 and 312 is about 0.5 inches (or about 12.7 mm). Outer surfaces of the generally semi-circular walls 310 and 312 therefore curve with a radius of curvature similar to a radius of curvature of the container support body 114 shown in FIGS. 1 and 7 to 9.

Figure 16:
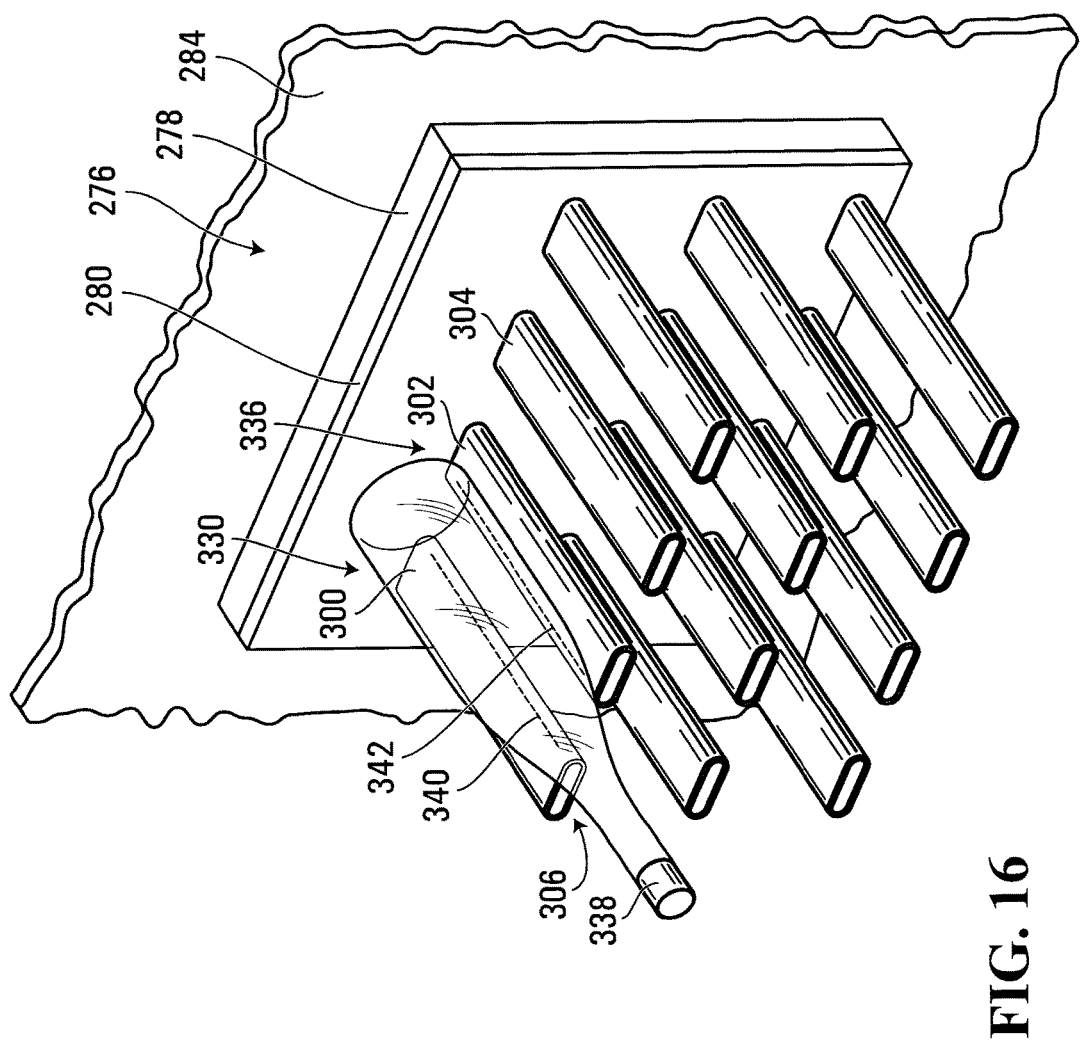
FIG. 16 is an assembled perspective view of the container support assembly of FIG. 14.

Referring to FIGS. 14 and 16, when the cover 300 covers the two structural bodies 326 and 328, the cover 300 and the structural bodies 326 and 328 form a container support body shown generally at 330 in FIG. 16. Likewise, when the cover 302 covers structural bodies 332 and 334, the cover 302 and the structural bodies 332 and 334 form a container support body shown generally at 336 in FIG. 16, and more generally as shown in FIG. 16, the container support assembly 276 also includes a plurality of container support bodies each including two adjacent structural bodies and a cover covering the two adjacent structural bodies. Centers of the generally circular shapes of the generally semi-circular walls of such covers (such as the generally semicircular walls 310 and 312 shown in FIGS. 14 and 15) are separated by the horizontal spacing distance 292, and accordingly adjacent pairs of the container support bodies shown in the embodiment of FIG. 16 are sized and positioned to support a wine bottle positioned longitudinally between such adjacent pairs, such as a 750 mL wine bottle 338 positioned longitudinally between the container support bodies 330 and 336.

Further, when the wine bottle 338 is positioned longitudinally between the container support bodies 330 and 336, a body of the wine bottle 338 contacts the container support body 330 along a longitudinal portion 340 of the cover 300 of the container support body 330, and the body of the wine bottle 338 also contacts the container support body 336 along a longitudinal portion 342 of the cover 302 of the container support body 336. Therefore, the covers in the embodiment shown are sized to extend longitudinally along a body of a wine bottle when the wine bottle is supported longitudinally by the container support bodies 330 and 336. The frictional materials of the covers 300 and 302 extend substantially along the entire lengths 296 of the container support bodies 330 and 336, so the longitudinal portions 340 and 342 of the covers 300 and 302 respectively are on frictional support surfaces extending substantially along the entire lengths 296 of the container support bodies 330 and 336.

Referring generally to FIGS. 14 to 16, in an alternative embodiment (not shown), the structural bodies 326 and 328 may be replaced with a single structural body sized to fill some, substantially all, or all of the opening 320 of the cover 300. Such a structural body may define two (or more generally, at least two) threaded openings to receive respective fasteners in locations of fasteners that mount the structural bodies 326 and 328 to the panel 278, although such fasteners may be inserted from a rear side of the panel 278. In another alternative embodiment (not shown), the structural bodies 326 and 328 may be replaced with a single structural body sized similarly to the cover 300 and having a frictional coating similar to the frictional coating 196 shown in FIGS. 7 to 9). In such embodiments, and in the embodiment shown in FIGS. 14 to 16, a container support body may be supported by two or more fasteners, which may provide greater strength or stability than some container support bodies supported by only one fastener.

Figure 17:
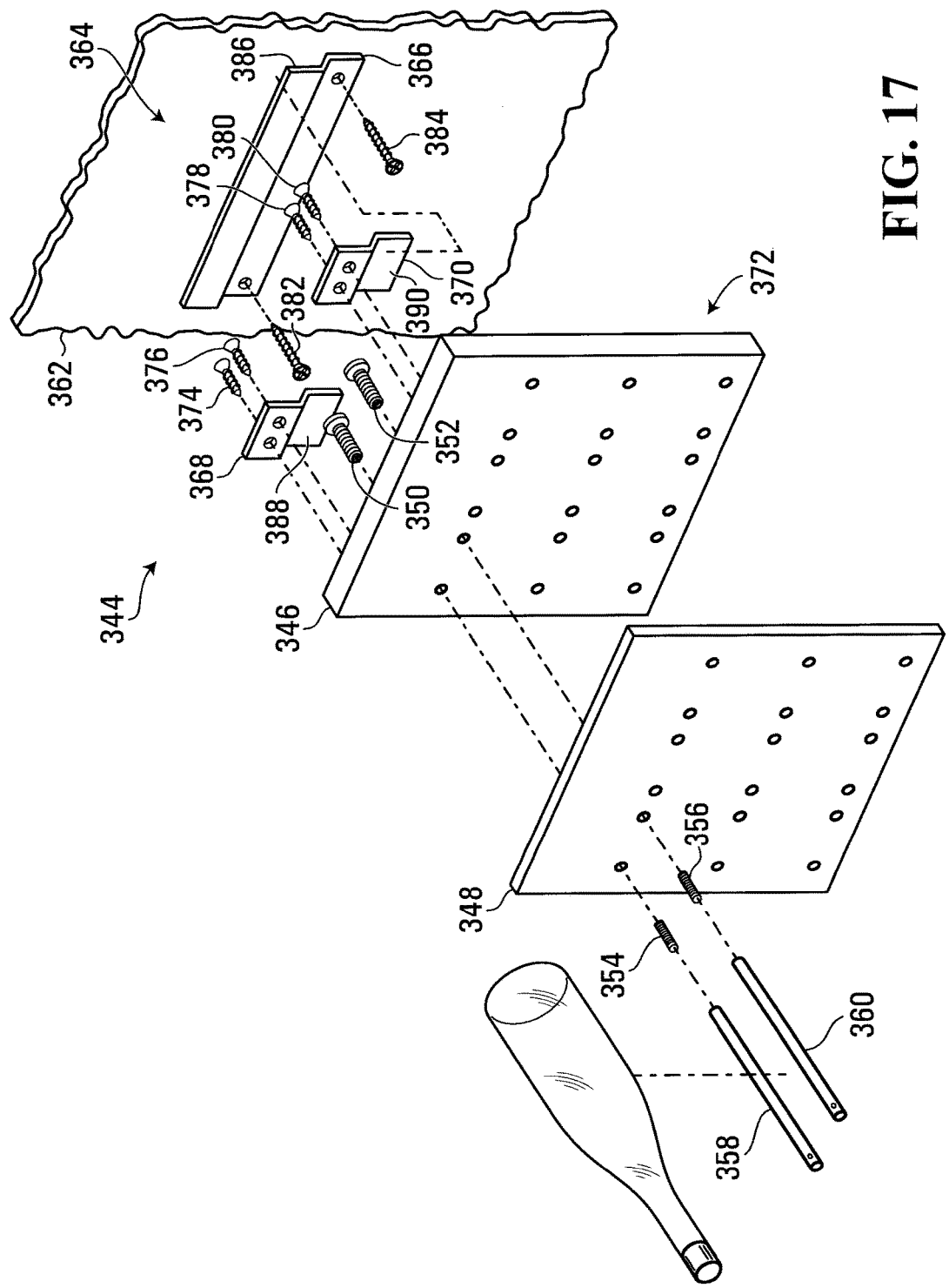
FIG. 17 is an exploded perspective view of a container support assembly according to another illustrative embodiment.
Figure 18:
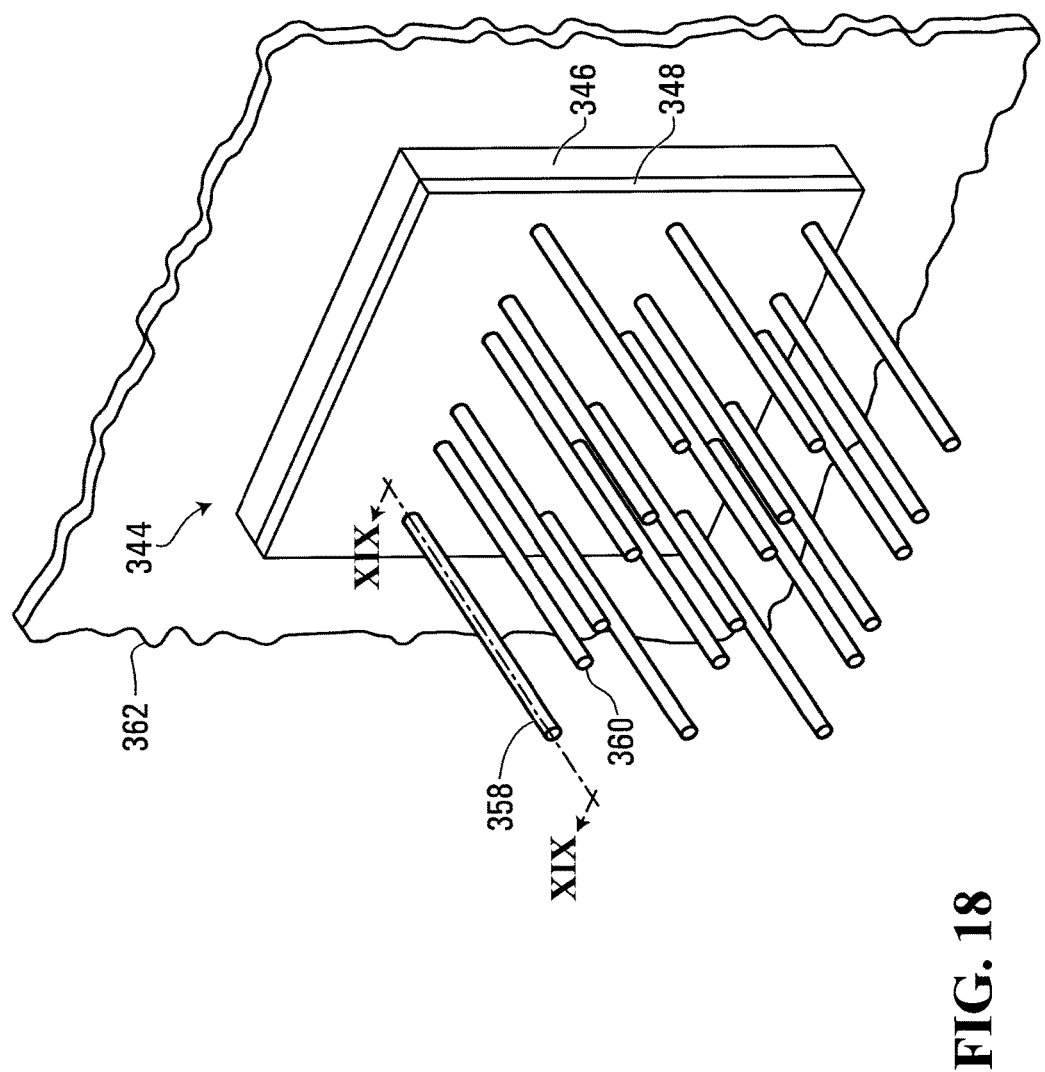
FIG. 18 is an assembled perspective view of the container support assembly of FIG. 17.
Figure 19:
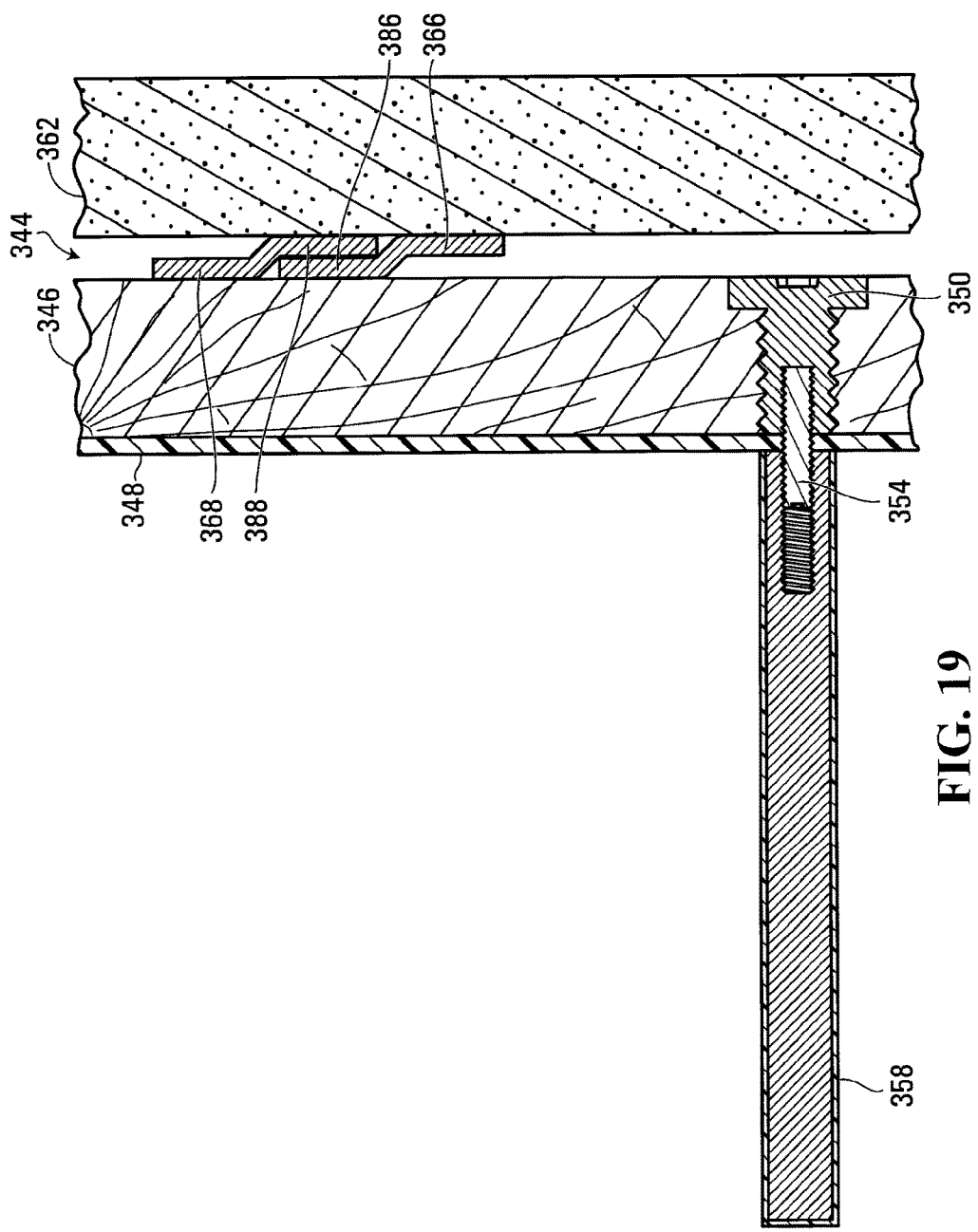
FIG. 19 is a cross-sectional view of the container support assembly of FIG. 17, taken along the line XIX-XIX shown in FIG. 18.

Referring to FIGS. 17 to 19, a container support assembly according to another illustrative embodiment is shown generally at 344 and includes a panel 346, a panel 348, an insert 350, an insert 352, a fastener 354, a fastener 356, a container support body 358, and a container support body 360. The panel 348 is substantially similar to the panel 104 (shown in FIGS. 1 and 5), the inserts 350 and 352 are substantially similar to the inserts 106 and 108 (shown in FIGS. 1, 3, and 4), the fasteners 354 and 356 are substantially similar to the fasteners 110 and 112 (shown in FIGS. 1 and 6), and the container support bodies 358 and 360 are substantially similar to the container support bodies 114 and 116 (shown in FIGS. 1 and 7 to 9) and may be mounted as described above.

The panel 346 is substantially similar to the panel 102 shown in FIGS. 1 and 2, although the panel 346 does not include through-openings in respective corners of the panel such as the through-openings 118, 120, 122, and 124 shown in FIGS. 1 and 2. Instead, the panel 346 may be mounted to a wall 362 using a mounting assembly shown generally at 364 and including a wall-mountable body 366 and panel-mountable bodies 368 and 370. In some embodiments, the mounting assembly 364 may include MONARCH™ "Z Clips" available from Monarch Metal Fabrication of Bohemia, N.Y., United States of America. In the embodiment shown in FIG. 17, the panel-mountable bodies 368 and 370 may be mounted to the panel 346 on a rear side shown generally at 372 of the panel 346 using fasteners 374, 376, 378, and 380, and the wall-mountable body 366 may be mounted to the wall 362 using fasteners 382 and 384.

As shown in FIGS. 17 and 19, the wall-mountable body 366 includes a projection 386 that is spaced apart from the wall 362 when the wall-mountable body 366 is mounted to the wall 362, thereby defining an opening between the projection 386 and the wall 362 when the wall-mountable body 366 is mounted to the wall 362. Also, the panel-mountable bodies 368 and 370 include respective projections 388 and 390 that are spaced apart from the panel 346 when the panel-mountable bodies 368 and 370 are mounted to the panel 346, thereby defining openings between the projections 388 and 390 and the panel 346 when the panel-mountable bodies 368 and 370 are mounted to the panel 346. The projections 388 and 390 may be received in the opening between the projection 386 and the wall 362 and the projection 386 may be received in the openings between the projections 388 and 390 and the panel 346, and the panel 346 may thus be mounted to the wall 362. Otherwise, the container support assembly 344 in the embodiment shown is substantially similar to the container support assembly 100.

Although FIGS. 17 to 19 illustrate the container support assembly 344 mounted to the wall 362 using the mounting assembly 364, alternative container support assemblies such as those described herein may be mounted to various different walls using mounting assemblies similar to the mounting assembly 364. For example, although the wall 362 is shown as a drywall panel, the wall 362 in alternative embodiments may be one or more of various different walls such as a concrete wall, a brick wall, or a wood wall, and fasteners such as the fasteners 382 and 384 may be fastened into drywall anchors (not shown), concrete anchors (not shown), or wood wall studs (not shown). In general, the wall-mountable body 366 may be mounted to various different walls in various different ways in alternative embodiments.

Figure 20:
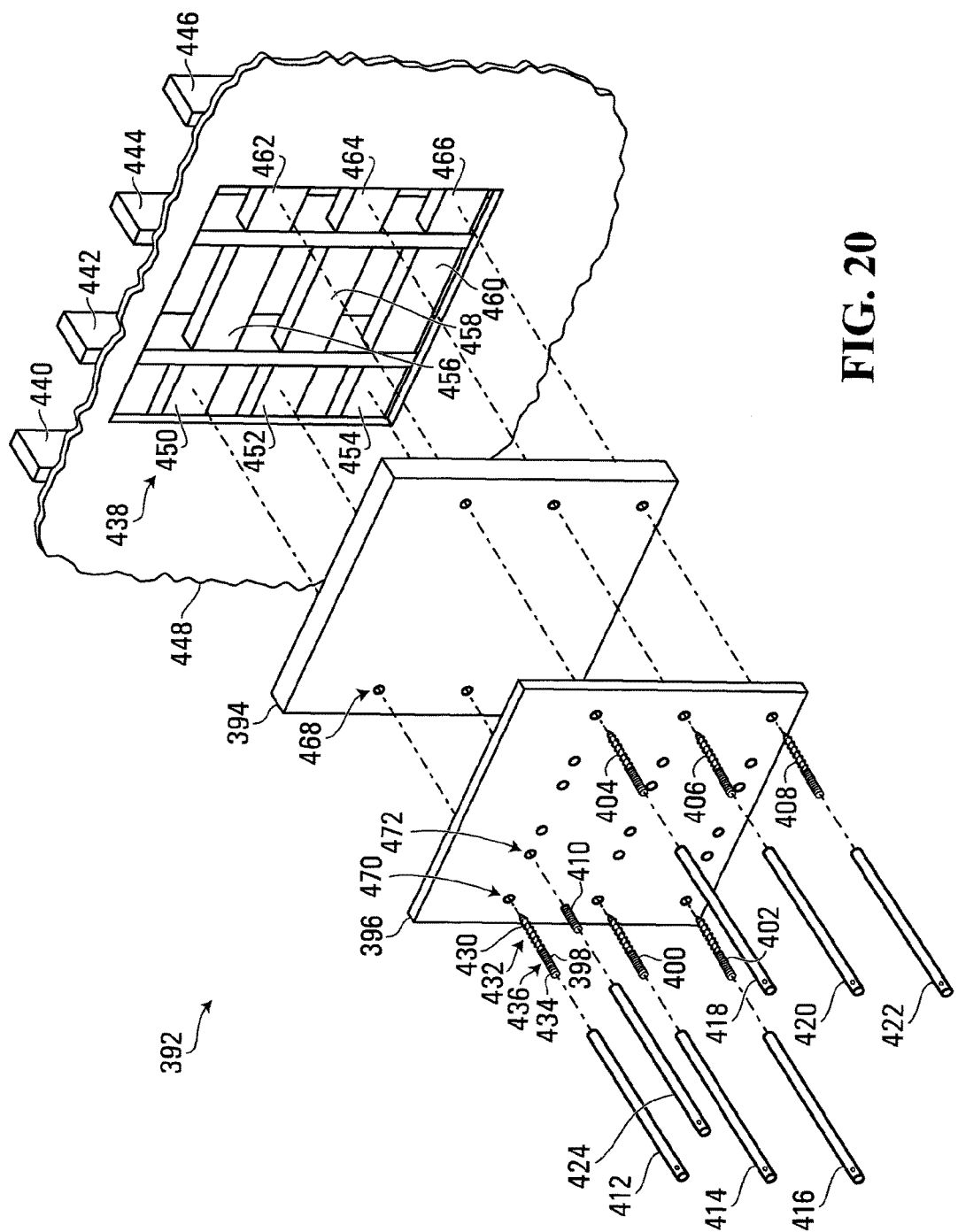
FIG. 20 is an exploded perspective view of a container support assembly according to another illustrative embodiment.

Referring to FIG. 20, a container support assembly according to another illustrative embodiment is shown generally at 392 and includes a panel 394, a panel 396, fasteners 398, 400, 402, 404, 406, 408, and 410, and container support bodies 412, 414, 416, 418, 420, 422, and 424. The panel 396 is substantially similar to the panel 104 but is formed from 10-gauge or ⅛-inch-thick sheet steel or aluminum in the embodiment shown, and each of the container support bodies 412, 414, 416, 418, 420, 422, and 424 is substantially similar to the container support body 114.

Figures 21, 22:
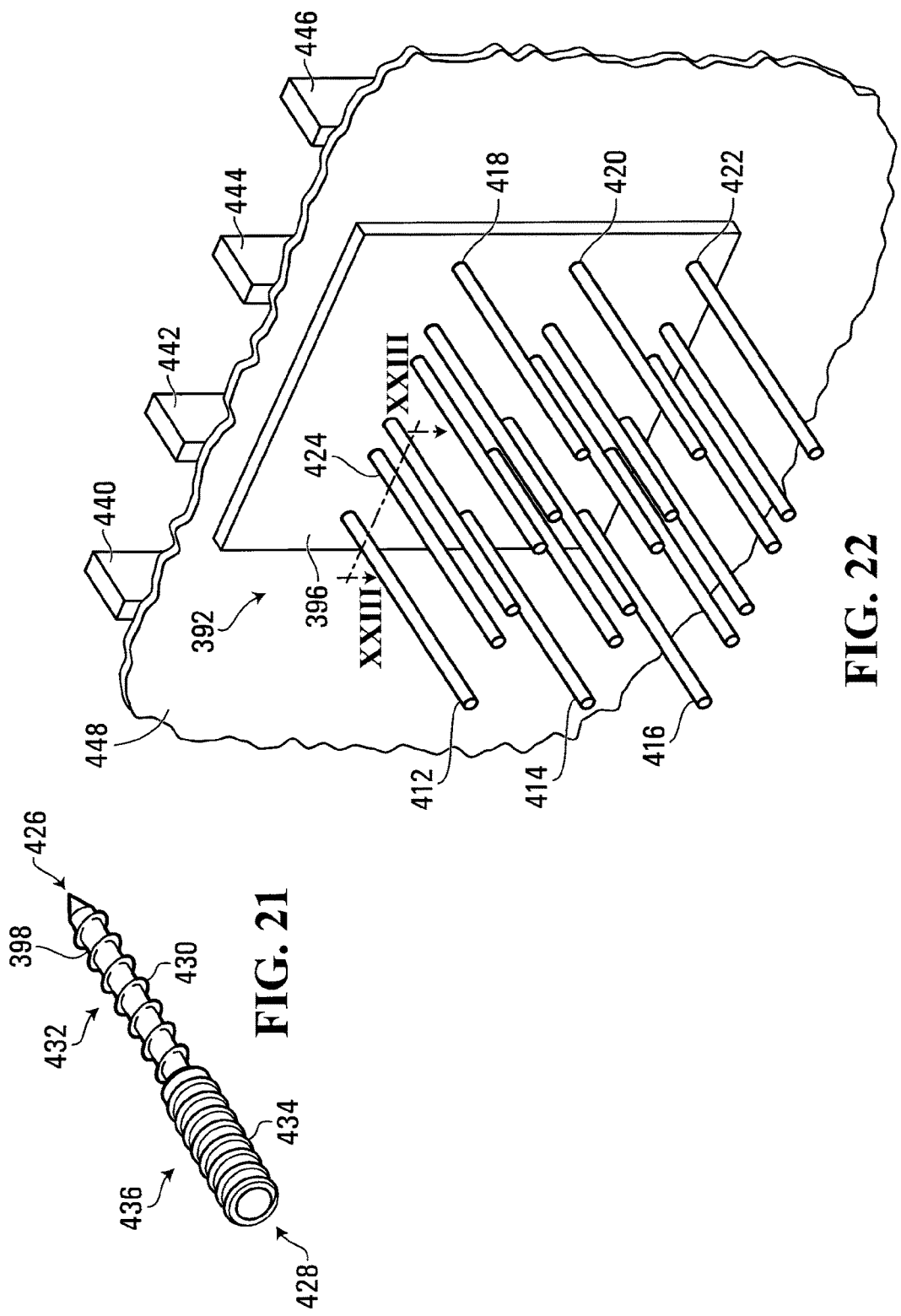
FIG. 21 is a perspective view of a fastener of the container support assembly of FIG. 20.
FIG. 22 is an assembled perspective view of the container support assembly of FIG. 20.

Referring to FIG. 21, the fastener 398 is a hanger bolt having a first end shown generally at 426 and a second end shown generally at 428 and opposite the first end 426. An external surface of the fastener 398 defines external threads 430 in a first threaded portion shown generally at 432 and proximate the first end 426, and the external surface of the fastener 398 also defines external threads 434 in a second threaded portion shown generally at 436 and proximate the second end 428. The external threads 430 in the first threaded portion 432 are wood screw threads, and the external threads 434 in the second threaded portion 436 are ¼-20 machine threads complementary to the internal threads of the threaded opening of the container support body 412 (substantially similar to the internal threads of the threaded opening 168 shown in FIG. 4), but may be different threads in alternative embodiments. The first threaded portion 432 is therefore configured to be threadedly coupled to a wood body (such as the wood body 450 described below), and the container support body 412 is thus configured to be coupled to the fastener 398 when an end portion of the fastener 398 including the second end 428 and the second threaded portion 436 is received in the threaded opening of the container support body 412.

Referring back to FIG. 20, the container support assembly 392 may be mounted to a wall shown generally at 438. The wall 438 includes generally vertical wall studs 440, 442, 444, and 446 and one or more drywall panels 448 mounted to the wall studs 440, 442, 444, and 446. In the embodiment shown, the wall studs 440, 442, 444, and 446 are cut from "2×6" dimensional lumber timber products, but the wall studs in alternative embodiments may differ. The wall 438 also includes wood bodies 450, 452, and 454 extending generally horizontally between the wall studs 440 and 442, wood bodies 456, 458, and 460 extending generally horizontally between the wall studs 442 and 444, and wood bodies 462, 464, and 466 extending generally horizontally between the wall studs 444 and 446. In the embodiment shown, the wood bodies 450, 452, 454, 456, 458, 460, 462, 464, and 466 are cut from "2×6" dimensional lumber timber products, but the wood bodies in alternative embodiments may differ. In general, such wood bodies may be positioned in walls to receive fasteners (such as the fasteners 398, 400, 402, 404, 406, 408, and 410 in the embodiment shown) to mount various different container support assemblies such as those described herein.

Figure 23:
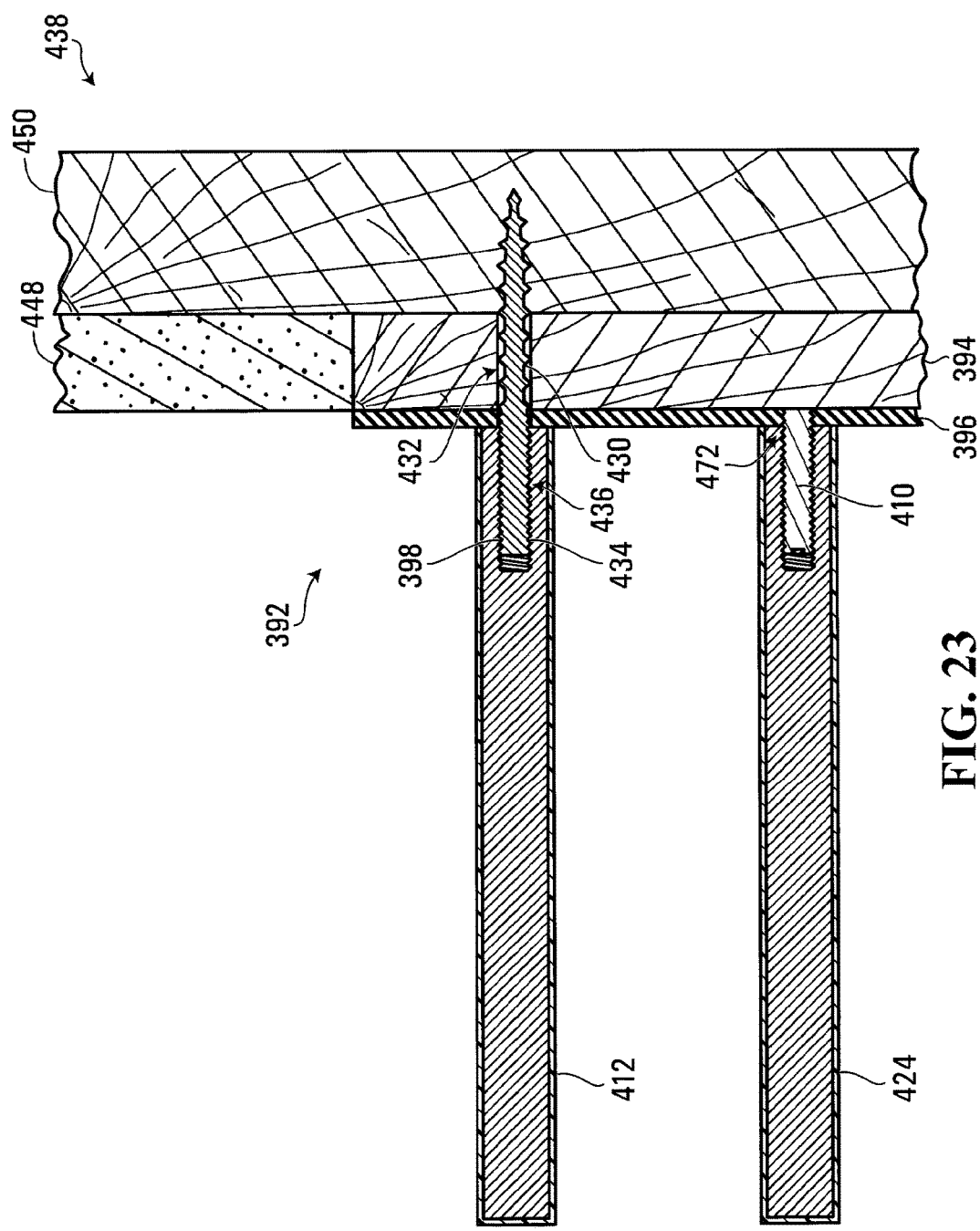
FIG. 23 is a cross-sectional view of the container support assembly of FIG. 20, taken along the line XXIII-XXIII shown in FIG. 22.

As shown in FIGS. 20 and 23, the external wood screw threads 430 in the first threaded portion 432 of the fastener 398 may be threadedly coupled to the wood body 450, the fastener 398 may be received in a through-opening shown generally at 468 of the panel 394 and in a through-opening shown generally at 470 of the panel 396, and the external threads 434 in the second threaded portion 436 of the fastener 398 may be threadedly coupled to the internal threads of the threaded opening of the container support body 412. In the embodiment shown, a drill chuck (not shown) may be coupled to the second threaded portion 436 of the fastener 398 to apply a torque to the fastener 398 to couple the fastener 398 to the wood body 450, or in alternative embodiments, the fastener 398 may define a tool interface (not shown) to facilitate receiving torque from tool (not shown). In general, the panel 394 is substantially similar to the panel 102 but includes respective through-openings as shown in FIG. 20 to receive the fasteners 398, 400, 402, 404, 406, 408, and 410.

As such, the wood body 450 functions as a mounting body to which the container support body 412 and the fastener 398 may be mounted by threadedly coupling the first threaded portion 432 of the fastener 398 in the wood body 450 and by coupling an end portion of the fastener 398 including the second end 428 and the second threaded portion 436 to the container support body 412 in the threaded opening of the container support body 412, and the panels 394 and 396 may be mounted between the container support body 412 and the wood body 450.

The fasteners 400, 402, 404, 406, and 408 in the embodiment shown are substantially similar to the fastener 398. Therefore, as with the fastener 398, the fastener 400 may pass through a through-opening in the panel 396 and through a through-opening in the panel 394 and wood screw threads in a first threaded portion of the fastener 400 may be threadedly coupled to the wood body 452 to mount the container support body 414 to the wood body 452, the fastener 402 may pass through a through-opening in the panel 396 and through a through-opening in the panel 394 and wood screw threads in a first threaded portion of the fastener 402 may be threadedly coupled to the wood body 454 to mount the container support body 416 to the wood body 454, the fastener 404 may pass through a through-opening in the panel 396 and through a through-opening in the panel 394 and wood screw threads in a first threaded portion of the fastener 404 may be threadedly coupled to the wood body 462 to mount the container support body 418 to the wood body 462, the fastener 406 may pass through a through-opening in the panel 396 and through a through-opening in the panel 394 and wood screw threads in a first threaded portion of the fastener 406 may be threadedly coupled to the wood body 464 to mount the container support body 420 to the wood body 464, and the fastener 408 may pass through a through-opening in the panel 396 and through a through-opening in the panel 394 and wood screw threads in a first threaded portion of the fastener 408 may be threadedly coupled to the wood body 466 to mount the container support body 422 to the wood body 466. The panels 394 and 396 are therefore also wall-mountable panels. In alternative embodiments, the panel 394 may be omitted and the panel 396 may be mounted directly to the wall. Also, in other embodiments, the panel 396 (with or without the panel 394) may be mounted to a drywall panel (not shown) using drywall anchors (not shown), or may be mounted to various other walls (not shown) such as concrete walls, brick walls, wood wall studs, or steel or other wall studs, for example.

However, the fastener 410 in the embodiment shown is substantially similar to the fastener 110 (shown in FIG. 6) and the panel 396 defines a threaded opening shown generally at 472 that defines internal threads complementary to the external threads of the fastener 410. Therefore, as shown in FIGS. 20 and 23, a first portion of the external threads of the fastener 410 is configured to be threadedly coupled to the panel 396 in the threaded opening 472 while a second portion of the external threads of the fastener 410 may be threadedly coupled to the container support body 424 in the threaded opening of the container support body 424. The container support body 424 is thus configured to be coupled to the fastener 410 when an end portion of the fastener 410 is received in the threaded opening defined by the container support body 424 as shown in FIG. 23. Accordingly, in the embodiment shown, the panel 396 also functions as a mounting body to which the container support body 424 and the fastener 410 may be mounted by threadedly coupling a first threaded portion of the fastener 410 in the panel 396 and by coupling an end portion of the fastener 410 to the container support body 424 in an opening of the container support body 424.

Although the panels 394 and 396 in the embodiment shown extend over only a portion of the wall 438, such panels in alternative embodiments may be sized differently and may cover an entire wall. In such embodiments, drywall such as the one or more drywall panels 448 may be omitted from the wall. In other alternative embodiments, a decorative trim or additional drywall panels (not shown) may surround the panel 396 to conceal edges of the panel 396 from sight. In still other alternative embodiments, the panels 394 and 396 may be received in and surrounded by the one or more drywall panels 448 to conceal edges of both of the panels 394 and 396 from sight. The one or more drywall panels 448 may be installed after the container support assembly 392 is mounted to the wall 438 to facilitate a smooth transition between the one or more drywall panels 448 and the edges of the panels 394 and 396.

Referring back to FIG. 9, as indicated above, rotation of one or both of the fastener 110 about the axis of rotation 186 and of the container support body 114 about the axis of rotation 206 adjusts a longitudinal position of the fastener 110 in the opening 200 defined by the container support body 114 and thereby adjusts the length 212 of the portion 214 of the fastener 110 that extends away from the container support body 114. Further, referring back to FIG. 19, a length of a portion of the fastener 354 that extends away from the container support body 358 may be similarly adjusted, and referring back to FIG. 23, a length of a portion of the fastener 398 that extends away from the container support body 412 may be similarly adjusted and a length of a portion of the fastener 410 that extends away from the container support body 424 may be similarly adjusted. In general, in various embodiments, such lengths may be adjusted for various reasons, such as to accommodate for variations in thicknesses of the various panels such as those described above and to position container support bodies tightly against an outer surface of a panel such as the panel 104, 280, 348, or 396, to accommodate for omitting one or more of the various panels such as the panel 104, 280, 348, or 396 and position container support bodies tightly against another outer surface, to accommodate for variations in positions of various inserts such as the inserts 106, 108, 350, and 352 and position container support bodies tightly against an outer surface of a panel such as the panel 104, 280, 348, or 396, or to accommodate for variations in a depth by which some fasteners, such as the fastener 398, may be threadedly coupled into a body such as the wood body 450 and position container support bodies tightly against an outer surface of a panel such as the panel 104, 280, 348, or 396.

In general, embodiments such as those described above may support containers such as wine bottles relatively more effectively when compared to alternatives. For example, referring to FIGS. 13 and 16, the contact between the body of the wine bottle <> 5262 along the longitudinal portions 270 and 272 of the frictional coatings of the container support bodies 114 and 116, and the contact between the body of the wine bottle 338 along the longitudinal portions 340 and 342 of the covers 300 and 302 of the container support bodies 330 and 336, may facilitate frictional contact to retain the wine bottles on the container support bodies more effectively than alternatives that may only contact wine bottles along shorter portions.

Embodiments such as those described above may be used for wine racks in wine cellars, which may be constructed according to particular needs of a customer. For example, a wine cellar may include walls such as the wall 438 shown in FIGS. 20 to 23 and engineered to hold weights of particular wine racks. Such wine cellars may further include supply and return air vents such as one or more 6-inch- or 8-inch-diameter pipes (not shown) for temperature control. Such wine cellars may also include insulation (not shown) to facilitate temperature control. In some embodiments, the insulation may be insulation available from Roxul Inc. of Milton, Ontario, Canada, rigid insulation, low-VOC (volatile organic compound) spray foam insulation, or blown-in insulation. PINK™ insulation may be inappropriate in some embodiments. In some embodiments, walls may be insulated to a minimum R-value of 20 and ceilings may be insulated to a minimum R-value of 28. Such wine cellars may also include electrical wires, lighting fixtures, and lighting controls (not shown) such as low-voltage dimmable components to control lighting in the wine cellar. Ceilings in some embodiments may include removable panels to facilitate accessing ducts, electrical components, or other objects in the ceiling. Further, vapor barriers such as 6-mm-thick "poly" plastic sheets (not shown) may be positioned on a warm side of the insulation with acoustic sealant (not shown) and TUCK TAPE™ (not shown) to seal the wine cellar completely. In some wine cellars, walls may be painted with low-VOC kitchen and bathroom paint.

Figure 24:
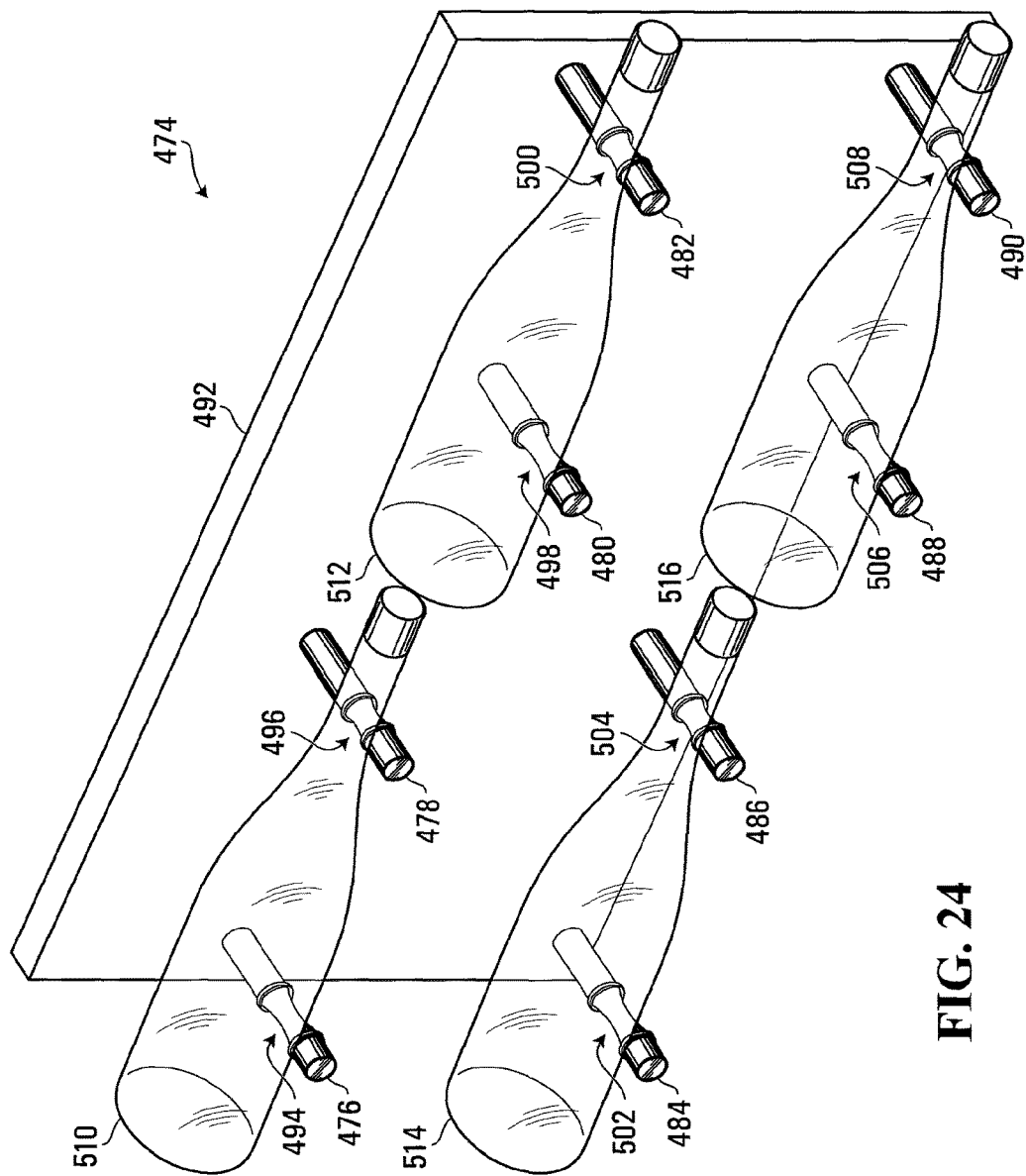
FIG. 24 is a perspective view of a container support assembly according to another illustrative embodiment.
Figure 25:
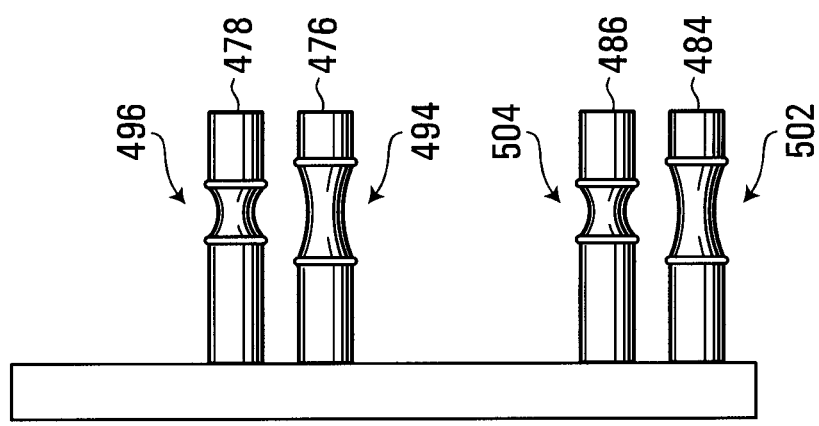
FIG. 25 is a side elevation view of the container support assembly of FIG. 24.

Referring to FIGS. 24 and 25, a container support assembly according to another illustrative embodiment is shown generally at 474 and includes container support bodies 476, 478, 480, 482, 484, 486, 488, and 490 mounted to a panel 492 that may be mounted to a wall (not shown) as described above. In the embodiment shown, each of the container support bodies 476, 478, 480, 482, 484, 486, 488, and 490 has a maximum diameter of about 0.745 inches (or about 18.9 mm) and a length of about 3.5 inches (or about 8.9 cm). The container support bodies 476, 478, 480, 482, 484, 486, 488, and 490 are otherwise substantially similar to the structural bodies described above, although the container support body 476 defines a recess shown generally at 494 and extending transversely across the container support body 476, the container support body 478 defines a recess shown generally at 496 and extending transversely across the container support body 478, the container support body 480 defines a recess shown generally at 498 and extending transversely across the container support body 480, the container support body 482 defines a recess shown generally at 500 and extending transversely across the container support body 482, the container support body 484 defines a recess shown generally at 502 and extending transversely across the container support body 484, the container support body 486 defines a recess shown generally at 504 and extending transversely across the container support body 486, the container support body 488 defines a recess shown generally at 506 and extending transversely across the container support body 488, and the container support body 490 defines a recess shown generally at 508 and extending transversely across the container support body 490. At their narrowest points, the recesses 494, 496, 498, 500, 502, 504, 506, and 508 in the embodiment shown have diameters of about 0.5 inches (or about 12.7 mm). Longitudinal centers of the recesses 494, 496, 498, 500, 502, 504, 506, and 508 (or narrowest diameters of the container support bodies 476, 478, 480, 482, 484, 486, 488, and 490) in the embodiment shown are about 2.125 inches (or about 5.4 cm) from an outer surface of the panel 492.

In the embodiment shown, the container support bodies 478, 482, 486, and 490 are positioned above the container support bodies 476, 480, 484, and 488 respectively by vertical spacing distances of about 1.125 inches (or about 28.6 mm), and the container support bodies 478, 482, 486, and 490 are horizontally spaced from the container support bodies 476, 480, 484, and 488 respectively by horizontal spacing distances of about 1.125 inches (or about 28.6 mm). Also in the embodiment shown, the container support bodies 476, 478, 480, and 482 are positioned above the container support bodies 484, 486, 488, and 490 respectively by vertical spacing distances of about 6 inches (or about 15.2 cm), and the container support bodies 480, 482, 488, and 490 are horizontally spaced from the container support bodies 476, 478, 484, and 486 respectively by horizontal spacing distances of about 14 inches (or about 35.6 cm).

Further, in the embodiment shown, external surfaces of the recesses 494, 498, 502, and 506 have radii of curvature of about 0.625 inches (or about 15.9 mm) and external surfaces of the recesses 496, 500, 504, and 508 have radii of curvature of about 0.5 inches (or about 12.7 mm). As such, as shown in FIG. 24, the recesses 494, 498, 502, and 506 are sized to receive a portion of a body of a respective 750 ml wine bottle 510, 512, 514, and 516 positioned transversely to the container support bodies 476, 480, 484, and 488 respectively, and the recesses 496, 500, 504, and 508 are sized to receive a portion of a neck of the respective wine bottle 510, 512, 514, and 516 positioned transversely to the container support bodies 478, 482, 486, and 490 respectively.

In the embodiment shown, the container support bodies 476, 478, 480, 482, 484, 486, 488, and 490 define grooves (not shown) sized to receive O-rings on each side of their respective recesses, and FIGS. 24 and 25 show O-rings positioned on each side of each of the recesses 494, 496, 498, 500, 502, 504, 506, and 508. The O-rings in the embodiment shown actually contact the wine bottles to support the wine bottles with frictional contact to prevent movement of the wine bottles.

Figure 26:
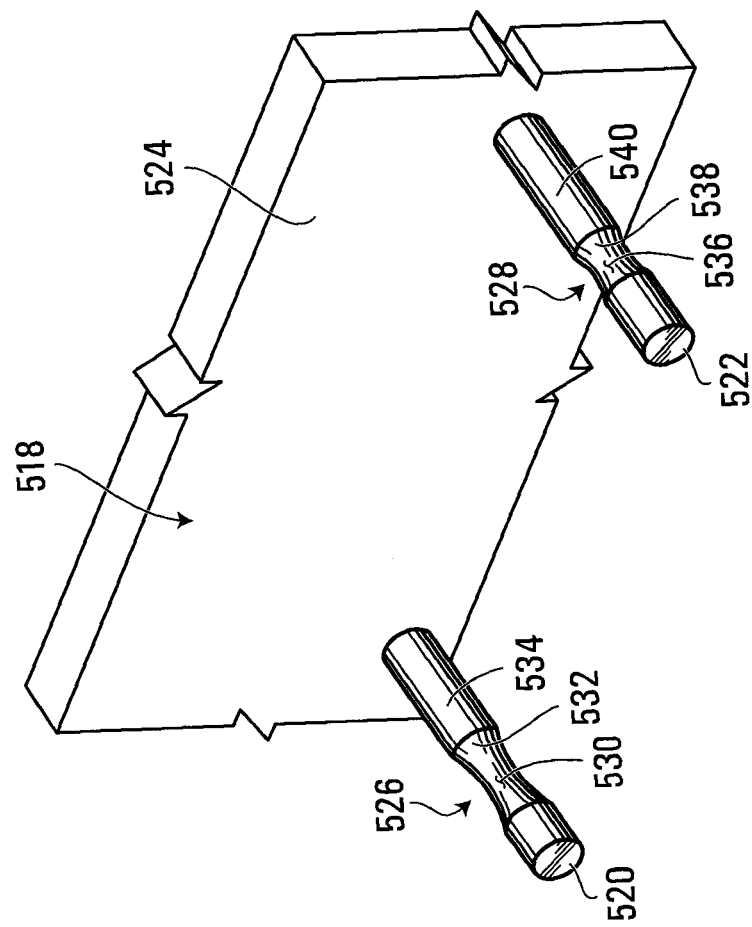
FIG. 26 is a perspective view of a container support assembly according to another illustrative embodiment.

Referring to FIG. 26, a container support assembly according to another illustrative embodiment is shown generally at 518 and includes container support bodies 520 and 522 mounted to a panel 524 that may be mounted to a wall (not shown) as described above. The container support bodies 520 and 522 are substantially similar to the container support bodies 476 and 478 (shown in FIGS. 24 and 25) respectively and define recesses shown generally at 526 and 528 respectively. However, the container support bodies 520 and 522 do not include O-rings and do not define grooves to receive O-rings. Instead, an outer surface 530 defining the recess 526 is formed from a frictional coating 532 on a structural body 534 of the container support body 520, and an outer surface 536 defining the recess 528 is formed from a frictional coating 538 on a structural body 540 of the container support body 522. In the embodiment shown, the structural bodies 534 and 540 are formed of brushed aluminum, but may be formed of other metals, or more generally other structural materials, in alternative embodiments. Also, in the embodiment shown, the frictional coatings 532 and 538 are a polyurethane coating such as a coating of Velvecron™ available from PPG Industries, Inc. of Pittsburgh, Pa., United States of America, but the frictional coatings may be formed of other frictional materials in alternative embodiments. The frictional coatings 532 and 538 contact a wine bottle (not shown) to support the wine bottle with frictional contact to prevent movement of the wine bottle in the absence of O-rings as shown in FIGS. 24 and 25.

Figure 27:
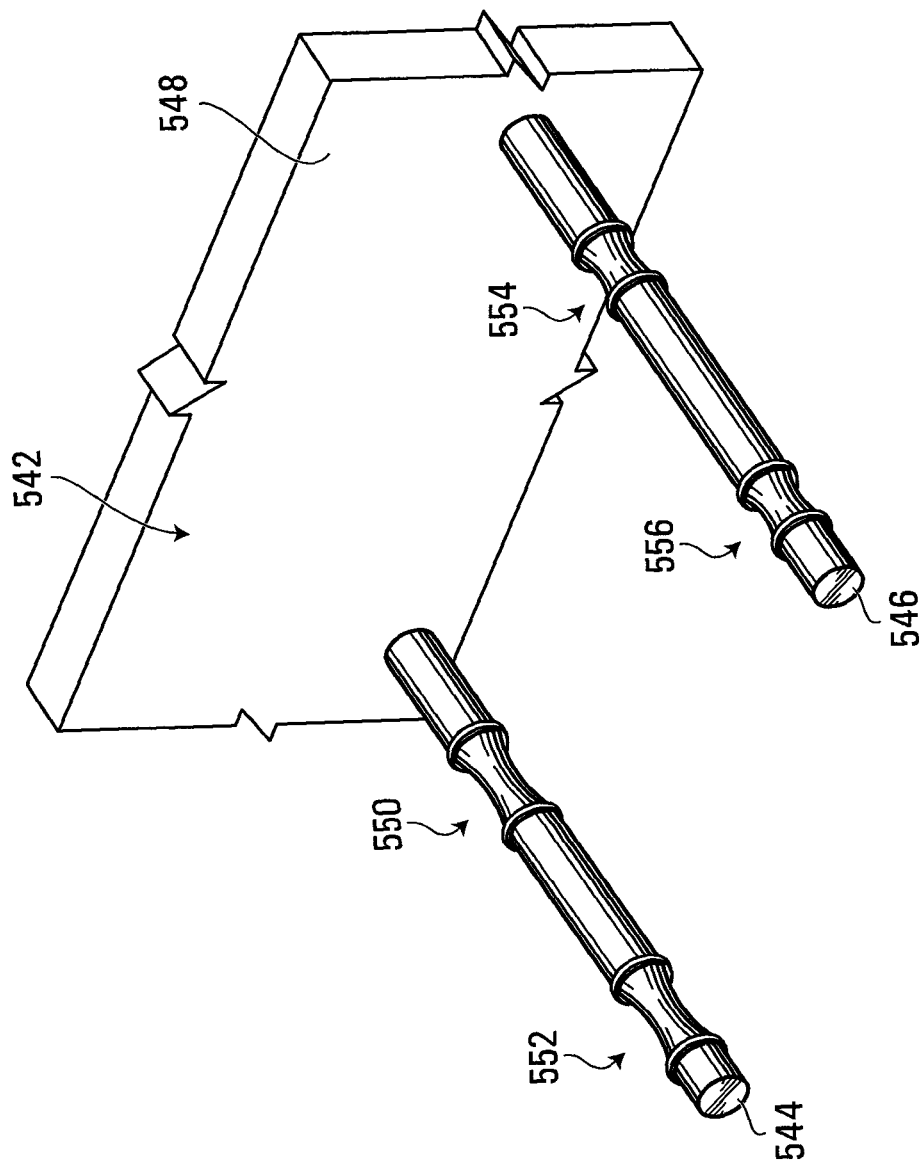
FIG. 27 is a perspective view of a container support assembly according to another illustrative embodiment.

Referring to FIG. 27, a container support assembly according to another illustrative embodiment is shown generally at 542 and includes container support bodies 544 and 546 mounted to a panel 548 that may be mounted to a wall (not shown) as described above. The container support bodies 544 and 546 are substantially similar to the container support bodies 476 and 478 (shown in FIGS. 24 and 25) respectively, although the container support body 544 defines two recesses 550 and 552, each sized and shaped substantially similar to the recess 494 shown in FIGS. 24 and 25 and longitudinally spaced apart from each other, and the container support body 546 defines two recesses 554 and 556, each sized and shaped substantially similar to the recess 496 shown in FIGS. 24 and 25 and longitudinally spaced apart from each other. Therefore, the container support assembly 542 can support two wine bottles (not shown) transversely to the container support bodies 544 and 546 with a portion of the body of a first one of the wine bottles received in the recess 550, a portion of the neck of the first one of the wine bottles received in the recess 554, a portion of the body of a second one of the wine bottles received in the recess 552, and a portion of the neck of the second one of the wine bottles received in the recess 556. In the embodiment shown, the container support bodies 544 and 546 extend by lengths of about 7.5 inches (or about 19.1 cm) from the panel 548, and longitudinal centers of the recesses 550 and 554 are about 2.125 inches (or about 5.4 cm) from an outer surface of the panel 548, and longitudinal centers of the recesses 552 and 556 are about 6.125 inches (or about 15.6 cm) from an outer surface of the panel 548.

Figure 28:
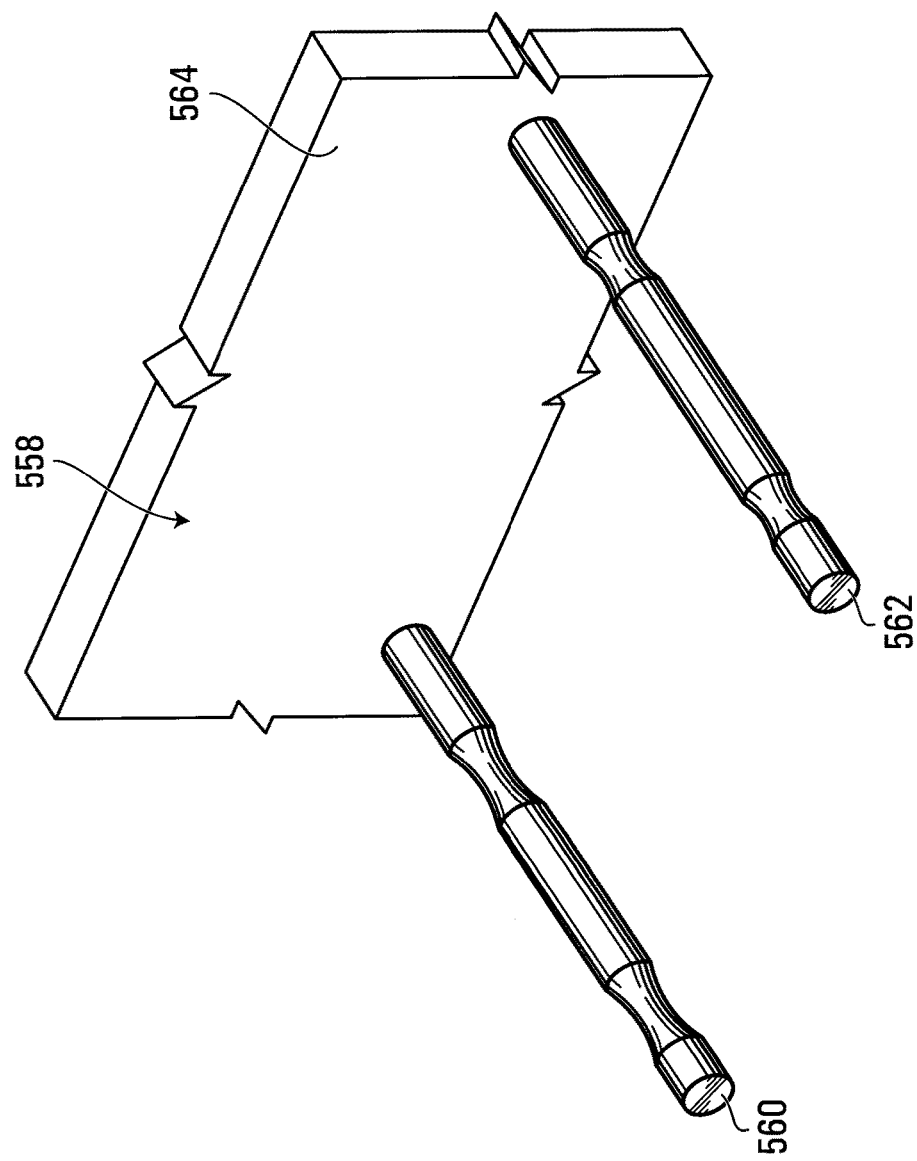
FIG. 28 is a perspective view of a container support assembly according to another illustrative embodiment.
Figure 29:
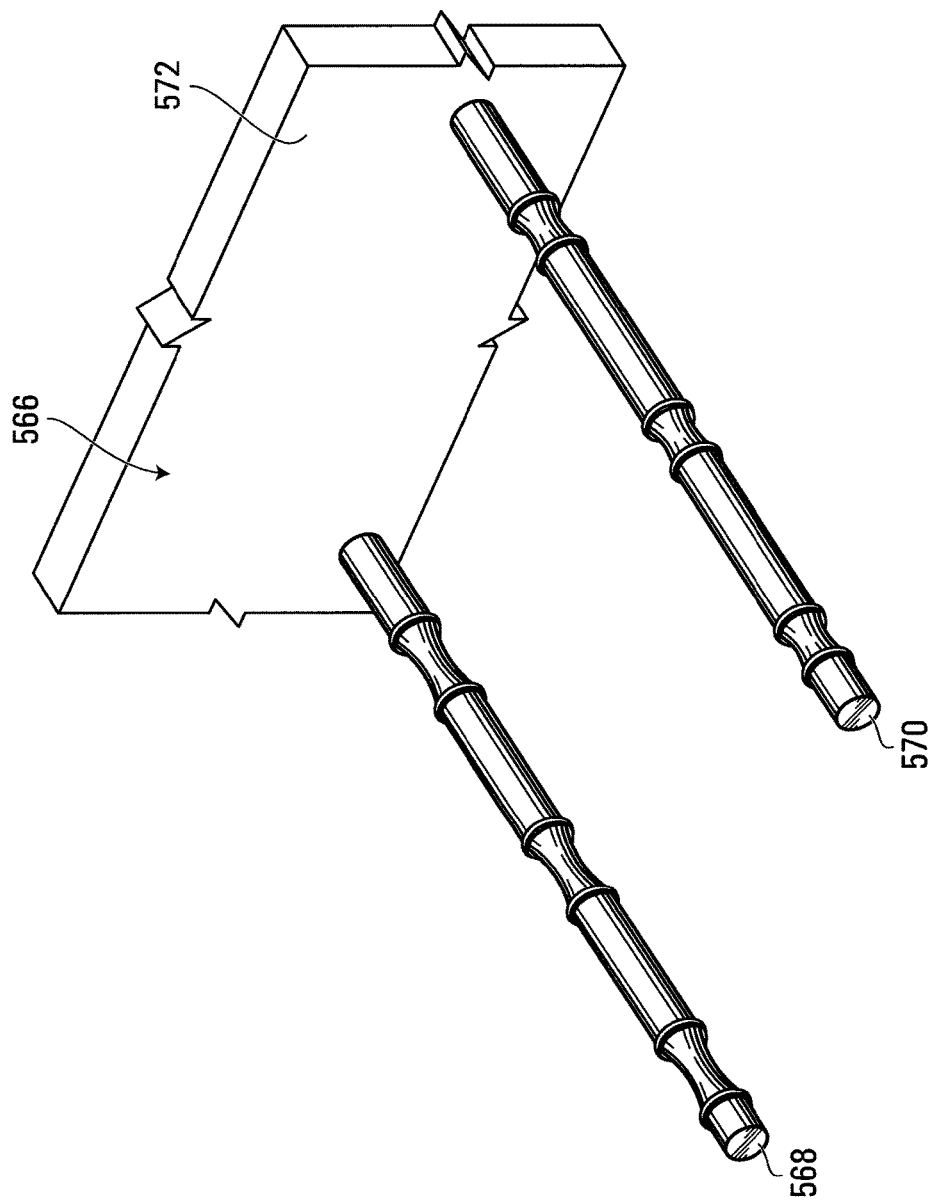
FIG. 29 is a perspective view of a container support assembly according to another illustrative embodiment.

Referring to FIG. 28, a container support assembly according to another illustrative embodiment is shown generally at 558 and includes container support bodies 560 and 562 mounted to a panel 564 that may be mounted to a wall (not shown) as described above. The container support bodies 560 and 562 are substantially similar to the container support bodies 544 and 546 (shown in FIG. 27) respectively, although as in the container support assembly 518 (shown in FIG. 26), the container support bodies 560 and 562 do not include O-rings and do not define grooves to receive O-rings, and instead outer surfaces defining the recesses are formed from frictional coatings on structural bodies of the container support bodies 560 and 562. Referring to FIG. 29, a container support assembly according to another illustrative embodiment is shown generally at 566 and includes container support bodies 568 and 570 mounted to a panel 572 that may be mounted to a wall (not shown) as described above. The container support bodies 568 and 570 are substantially similar to the container support bodies 544 and 546 (shown in FIG. 27), except that each of the container support bodies 568 and 570 defines three recesses, so the container support assembly 566 can support three wine bottles (not shown) transversely to the container support bodies 568 and 570. In the embodiment shown, the container support bodies 568 and 570 extend by lengths of about 11.5 inches (or about 29.2 cm) from the panel 572, and longitudinal centers of the recesses are about 2.125 inches (or about 5.4 cm), about 6.125 inches (or about 15.8 cm), or about 10.125 inches (or about 25.7 cm) from an outer surface of the panel 572.

Figure 30:
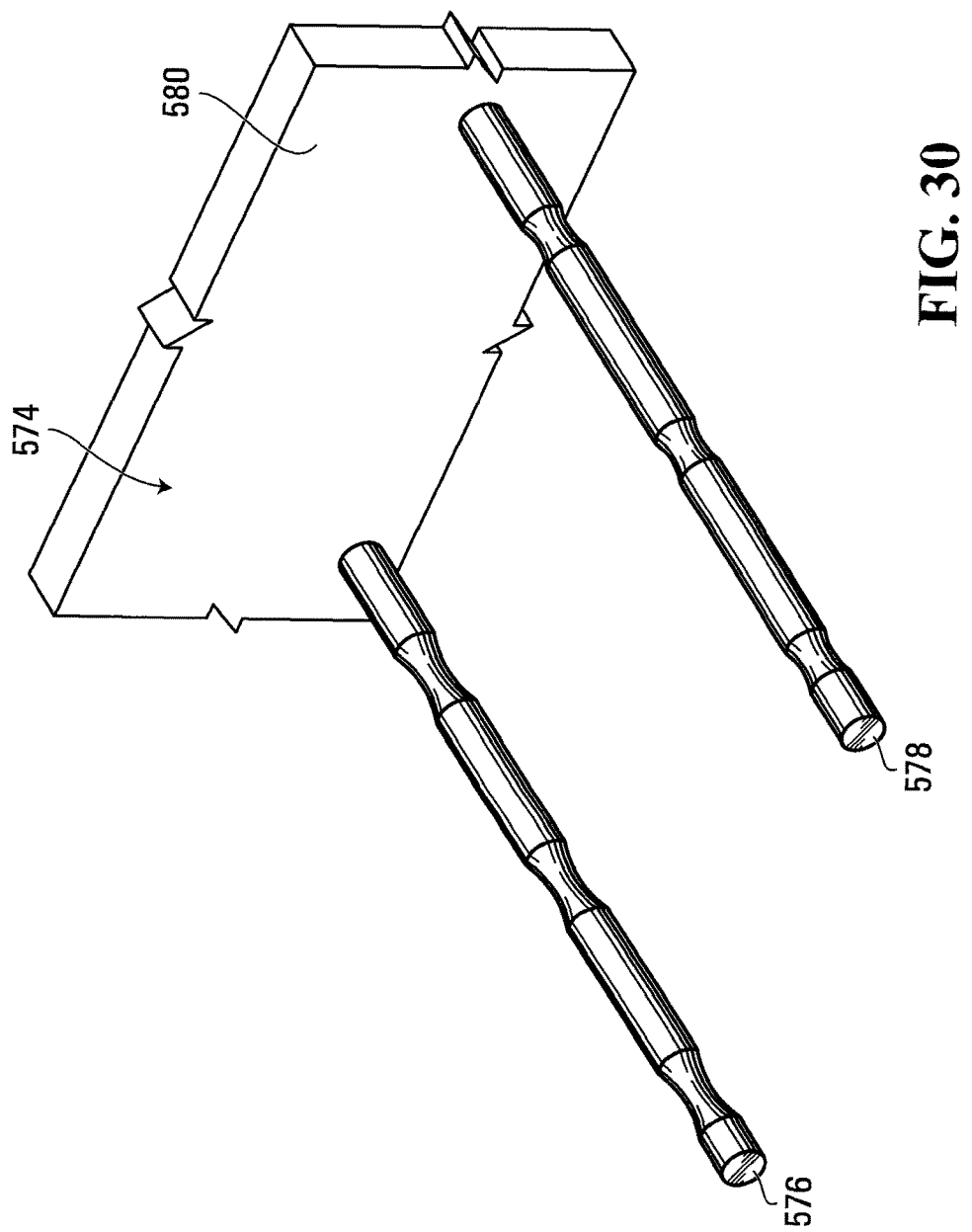
FIG. 30 is a perspective view of a container support assembly according to another illustrative embodiment.

Referring to FIG. 30, a container support assembly according to another illustrative embodiment is shown generally at 574 and includes container support bodies 576 and 578 mounted to a panel 580 that may be mounted to a wall (not shown) as described above. The container support bodies 576 and 578 are substantially similar to the container support bodies 560 and 562 (shown in FIG. 28), except that each of the container support bodies 576 and 578 defines three recesses, so the container support assembly 574 can support three wine bottles (not shown) transversely to the container support bodies 576 and 578.

In general, the embodiments described above may be used for wine racks in wine cellars or in other locations in homes or in other buildings. Commercial embodiments may include kits including one or more container support systems, mounting bodies, and panels such as those described above, and may further include instructions to assemble and install container support assemblies such as those described above. Container support systems, container support assemblies, and kits such as those described above may be offered commercially for use in assembly and installation of wine racks, or for use in wine racks.

In some embodiments such as some kits, inserts (such as the inserts 106 and 108 shown in FIGS. 1, 3, 4, and 12) may be pre-coupled to panels (such as the panel 102 shown in FIGS. 1, 2, and 12), and such kits may allow assembling container support assemblies (such as the container support assembly 100 shown in FIGS. 1 and 11 to 13) without having to access rear sides of such panels (such as the rear side 128 of the panel 102 shown in FIG. 1). In other embodiments, container support systems (such as a container support system including the container support body 424 and the fastener 410 shown in FIGS. 20, 22, and 23) may be mounted to a mounting body (such as the panel 396) also without having to access rear sides of such panels. Assembly of such container support assemblies may be more efficient when compared to alternatives because less time may be required to assemble such container support assemblies from front sides of such panels. Also, container support systems such as those described above permit adjusting lengths of portions of fasteners that extend away from container support bodies (such as adjusting the length 212 of the portion 214 of the fastener 110 that extends away from the container support body 114 as explained above with reference to FIG. 9), and such adjustability permits a particular container support system to be used in various applications notwithstanding variations in thicknesses of panels, of positions of inserts in panels, or other variations that may be accommodated by adjusting lengths of portions of such fasteners.

Although specific embodiments have been described and illustrated, such embodiments should be considered illustrative only and not as limiting the invention as construed according to the accompanying claims. For example, dimensions described above and shown in the drawings, and materials described above, are illustrative only, and alternative embodiments may include various different dimensions, materials, and combinations of materials. Further, aspects of the embodiments described above are interchangeable in various ways. For example, container support systems such as those described above may be mounted to various mounting bodies such as those described above, and mounting bodies such as those described above may be mounted to various walls such as the walls described above in various different ways.

What is claimed is:

1. A method of mounting a container support body to a mounting body, the method comprising:
    threadedly coupling a first threaded portion of a fastener to the mounting body, wherein the mounting body comprises a first panel, wherein the first panel comprises an insert, wherein the first threaded portion of the fastener is proximate a first end of the fastener, and wherein threadedly coupling the first threaded portion of the fastener to the mounting body comprises:
        inserting the first threaded portion of the fastener, from a front side of the first panel, into a threaded opening defined by the insert; and
        threadedly coupling the first threaded portion of the fastener to the mounting body in the threaded opening defined by the insert; and
    coupling an end portion of the fastener to the container support body in an opening defined by the container support body, wherein:
        the end portion of the fastener comprises a second end of the fastener opposite the first end of the fastener;
        the end portion of the fastener is on the front side of the first panel when the first threaded portion of the fastener is threadedly coupled to the mounting body by insertion of the first threaded portion of the fastener, from the front side of the first panel, into the threaded opening defined by the insert; and
        coupling the end portion of the fastener to the container support body comprises inserting the fastener, from the second end of the fastener, into the opening defined by the container support body.

2. The method of claim 1 further comprising adjusting a longitudinal position of the fastener in the opening defined by the container support body to adjust a length of a portion of the fastener that extends away from the container support body.

3. The method of claim 2 wherein the container support body defines internal threads in the opening defined by the container support body.

4. The method of claim 3 wherein adjusting the longitudinal position of the fastener in the opening defined by the container support body comprises rotating at least one of the container support body and the fastener to move a second threaded portion of the fastener, proximate the second end of the fastener and defining threads complementary to the internal threads, longitudinally in the opening defined by the container support body.

5. The method of claim 4 wherein rotating the at least one of the container support body and the fastener comprises rotating the container support body.

6. The method of claim 5 wherein rotating the container support body comprises applying a torque from a torque application tool to a tool interface defined by the container support body.

7. The method of claim 6 wherein the tool interface comprises an inner surface of a lateral opening defined by the container support body.

8. The method of claim 1 wherein the container support body is generally rotationally symmetric about a longitudinal axis of the container support body.

9. The method of claim 8 wherein the container support body has a generally cylindrical outer surface.

10. The method of claim 8 wherein the container support body defines at least one recess extending transversely across the container support body to receive at least a portion of a container positioned transversely to the container support body.

11. The method of claim 10 wherein the at least one recess comprises a recess sized to receive a portion of a body of a wine bottle positioned transversely to the container support body.

12. The method of claim 10 wherein the at least one recess comprises a recess sized to receive a portion of a neck of a wine bottle positioned transversely to the container support body.

13. The method of claim 1 wherein the first portion of the fastener defines machine screw threads.

14. The method of claim 1 wherein the insert is configured to be coupled to the first panel by coupling the insert to the first panel in an opening in the first panel.

15. The method of claim 14 wherein the insert is configured to be coupled to the first panel by threadedly coupling the insert to the first panel in the opening in the first panel.

16. The method of claim 14 wherein the opening in the first panel is a through-opening in the first panel extending between the front of the first panel and a rear side of the first panel opposite the front side of the first panel.

17. The method of claim 16 wherein:
the insert is insertable in the through-opening of the first panel from the rear side of the first panel; and
when the insert is inserted in the through-opening of the first panel from the rear side of the first panel, the threaded opening defined by the insert is exposed on the front side of the first panel.

18. The method of claim 1 further comprising mounting a second panel between the container support body and the mounting body.

19. The method of claim 18 wherein mounting the second panel between the container support body and the mounting body comprises mounting the second panel between the container support body and the mounting body only by mounting a plurality of container support bodies to the mounting body.

20. The method of claim 1 further comprising supporting a wine bottle on the container support body.

21. A container support system comprising:
a mounting body comprising:
a first panel having a front side and a rear side opposite the front side; and
a plurality of inserts configured to be coupled to the first panel;
a fastener having a first end and a second end opposite the first end, the fastener defining a first threaded portion proximate the first end, wherein when at least one of the plurality of inserts is coupled to the first panel, each one of the at least one of the plurality of inserts defines a threaded opening complementary to the first threaded portion such that the first threaded portion is threadedly coupleable to the mounting body when the second end is on the front side of the first panel, by insertion of the first threaded portion, into the threaded opening defined by the at least one of the plurality of inserts; and
a container support body defining an opening and coupleable to the fastener by insertion of the fastener, from the second end of the fastener, into the opening defined by the container support body.

22. The system of claim 21 wherein when the end portion of the fastener is received in the opening defined by the container support body, a longitudinal position of the fastener in the opening defined by the container support body is adjustable to adjust a length of a portion of the fastener that extends away from the container support body.

23. The system of claim 22 wherein the container support body defines internal threads in the opening defined by the container support body.

24. The system of claim 23 wherein the fastener defines a second threaded portion proximate the second end of the fastener and complementary to the internal threads.

25. The system of claim 21 wherein the container support body defines a tool interface.

26. The system of claim 25 wherein the tool interface comprises an inner surface of a lateral opening defined by the container support body.

27. The system of claim 21 wherein the container support body is generally rotationally symmetric about a longitudinal axis of the container support body.

28. The system of claim 27 wherein the container support body has a generally cylindrical outer surface.

29. The system of claim 27 wherein the container support body defines at least one recess extending transversely across the container support body to receive at least a portion of a container positioned transversely to the container support body.

30. The system of claim 29 wherein the at least one recess comprises a recess sized to receive a portion of a body of a wine bottle positioned transversely to the container support body.

31. The system of claim 29 wherein the at least one recess comprises a recess sized to receive a portion of a neck of a wine bottle positioned transversely to the container support body.

32. The system of claim 21 wherein the first threaded portion of the fastener defines machine screw threads.

33. The system of claim 21 wherein the plurality of inserts are configured to be coupled to the first panel by coupling the plurality of inserts to the first panel in respective openings in the first panel.

34. The system of claim 33 wherein the plurality of inserts are configured to be coupled to the first panel by threadedly coupling the plurality of inserts to the first panel in the respective openings in the first panel.

35. The system of claim 33 wherein the openings in the first panel are through-openings extending between the front and rear sides of the first panel.

36. The system of claim 35 wherein:
the plurality of inserts are insertable in the respective through-openings of the first panel from the rear side of the first panel; and
when the plurality of inserts are inserted in the respective through-openings of the first panel from the rear side of the first panel, the threaded opening of each one of the at least one of the plurality of inserts is exposed on the front side of the first panel.

37. The system of claim 21 wherein the plurality of inserts are coupled to the first panel.

38. The system of claim 21 further comprising a second panel configured to be mounted between: the container support body; and the mounting body.

39. The system of claim 21 wherein:
the container support body comprises:
a structural body comprising a structural material; and
a frictional body on the structural body and comprising a frictional material different from the structural material;
the frictional material defines a frictional support surface extending substantially along an entire length of the container support body; and
the frictional material is non-metallic.

40. The system of claim 39 wherein the frictional support surface is sized to extend longitudinally along a body of a wine bottle when the wine bottle is supported longitudinally by the apparatus.

41. The system of claim 39 wherein the structural material is metallic.

42. The system of claim 39 wherein the frictional material comprises silicone.

43. The system of claim 39 wherein the frictional material comprises polyurethane.

44. The system of claim 39 wherein the frictional body is a frictional coating on the structural body.

45. The system of claim 39 wherein the frictional body is a cover releasably held on the structural body.

46. The system of claim 39 wherein the container support body is generally rotationally symmetric about a longitudinal axis of the container support body.

47. The system of claim 46 wherein the container support body has a generally cylindrical outer surface.

48. The system of claim 39 wherein the container support body defines at least two threaded openings for receiving respective threaded fasteners.

* * * * *